United States Patent
Han et al.

(10) Patent No.: US 8,165,075 B2
(45) Date of Patent: Apr. 24, 2012

(54) METHOD AND APPARATUS FOR TRANSMITTING/RECEIVING FEEDBACK INFORMATION IN MOBILE TELECOMMUNICATION USING MULTIPLE INPUT MULTIPLE OUTPUT

(75) Inventors: Jin-Kyu Han, Seoul (KR); Hwan-Joon Kwon, Hwaseong-si (KR); Dong-Hee Kim, Yongin-si (KR); Jae-Chon Yu, Suwon-si (KR); Yeon-Ju Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1137 days.

(21) Appl. No.: 12/013,786

(22) Filed: Jan. 14, 2008

(65) Prior Publication Data

US 2008/0170523 A1    Jul. 17, 2008

(30) Foreign Application Priority Data

Jan. 12, 2007    (KR) .................. 10-2007-0004019

(51) Int. Cl.
*H04W 4/00* (2009.01)
(52) U.S. Cl. .......................... 370/329; 370/342
(58) Field of Classification Search .................. None
See application file for complete search history.

(56) References Cited

U.S. PATENT DOCUMENTS

| | | | |
|---|---|---|---|
| 7,515,644 B2* | 4/2009 | Chae et al. | 375/267 |
| 7,590,045 B2* | 9/2009 | Oh et al. | 370/210 |
| 7,623,590 B2* | 11/2009 | Hottinen | 375/267 |
| 7,676,007 B1* | 3/2010 | Choi et al. | 375/347 |
| 7,688,899 B2* | 3/2010 | Ketchum et al. | 375/260 |
| 8,009,754 B2* | 8/2011 | She et al. | 375/267 |
| 2003/0148738 A1* | 8/2003 | Das et al. | 455/67.5 |
| 2005/0052991 A1* | 3/2005 | Kadous | 370/216 |
| 2006/0039496 A1* | 2/2006 | Chae et al. | 375/267 |
| 2006/0079221 A1* | 4/2006 | Grant et al. | 455/423 |
| 2006/0223449 A1* | 10/2006 | Sampath et al. | 455/69 |
| 2006/0268788 A1* | 11/2006 | Harris et al. | 370/335 |
| 2006/0270360 A1* | 11/2006 | Han et al. | 455/69 |
| 2006/0276212 A1* | 12/2006 | Sampath et al. | 455/513 |
| 2007/0011550 A1* | 1/2007 | Agrawal et al. | 714/746 |
| 2008/0069031 A1* | 3/2008 | Zhang et al. | 370/328 |
| 2008/0181181 A1* | 7/2008 | Gorokhov et al. | 370/335 |
| 2009/0161655 A1* | 6/2009 | Uppala | 370/350 |
| 2009/0170437 A1* | 7/2009 | Bhattad et al. | 455/63.1 |
| 2009/0190684 A1* | 7/2009 | She et al. | 375/267 |
| 2009/0257395 A1* | 10/2009 | Jin et al. | 370/329 |
| 2010/0118824 A1* | 5/2010 | Ihm et al. | 370/329 |
| 2010/0202553 A1* | 8/2010 | Kotecha et al. | 375/267 |
| 2010/0284357 A1* | 11/2010 | Wilson et al. | 370/329 |
| 2011/0044376 A1* | 2/2011 | Lin et al. | 375/130 |
| 2011/0199926 A1* | 8/2011 | Zheng et al. | 370/252 |

* cited by examiner

Primary Examiner — Bunjob Jaroenchonwanit
(74) Attorney, Agent, or Firm — The Farrell Law Firm, P.C.

(57) ABSTRACT

A method for transmitting feedback information in a mobile communication system using Multiple Input Multiple Output (MIMO) is provided. The method includes, when knockdown precoding is used and Antenna Selection precoding is used, setting an index field for indicating a universal matrix of a precoding matrix of a first reverse feedback channel to a value indicating whether Antenna Selection Space Time Transmit Diversity (STTD) is present; when the knockdown precoding is used and the Antenna Selection precoding is used, writing antenna selection information in a vector bitmap field of the first reverse feedback channel; and when the knockdown precoding is used and the Antenna Selection precoding is used, estimating Channel Quality Information (CQI) according to the antenna selection information and writing the estimated CQI in a CQI field of a second reverse feedback channel.

38 Claims, 12 Drawing Sheets

METHOD AND APPARATUS FOR TRANSMITTING/RECEIVING FEEDBACK INFORMATION IN MOBILE TELECOMMUNICATION USING MULTIPLE INPUT MULTIPLE OUTPUT

PRIORITY

This application claims priority under 35 U.S.C. §119(a) to Korean Patent Application No. 10-2007-0004019, filed on Jan. 12, 2007, in the Korean Intellectual Property Office, the disclosure of which is incorporated herein by reference.

BACKGROUND OF THE INVENTION

1. Field of the Invention

The present invention relates generally to a mobile communication system, and in particular, to a method and apparatus for transmitting and receiving reverse feedback information in a wireless packet data communication system using Multi Input Multi Output (MIMO).

2. Description of the Related Art

Mobile communication systems have evolved into high-speed, high-quality wireless packet data communication systems to provide data services and multimedia services beyond the early voice-oriented services. Recently, various mobile communication standards, such as High Speed Downlink Packet Access (HSDPA) and High Speed Uplink Packet Access (HSUPA), both defined in the $3^{rd}$ Generation Partnership Project (3GPP), High Rate Packet Data (HRPD) defined in the $3^{rd}$ Generation Partnership Project-2 (3GPP2), and 802.16 defined in IEEE, have been developed to support high-speed, high-quality wireless packet data communication services.

The existing $3^{rd}$ Generation wireless packet data communication systems, such as HSDPA, HSUPA and HRPD, use technologies such as an Adaptive Modulation and Coding (AMC) method and a Channel-Sensitive Scheduling method to improve transmission efficiency. With the use of the AMC method, a transmitter can adjust the amount of transmission data according to the channel state. That is, when the channel state is not 'Good', the transmitter reduces the amount of transmission data to adjust the reception error probability to a desired level, and when the channel state is 'Good', the transmitter increases the amount of transmission data to adjust the reception error probability to the desired level, thereby efficiently transmitting a large volume of information.

With the use of the Channel-Sensitive Scheduling-based resource management method, the transmitter selectively services the user having a better channel state among several users, thus increasing the system capacity compared to the method of allocating a channel to one user and servicing the user with the allocated channel. Such capacity increase is known as 'multi-user diversity gain'. In sum, the AMC method and the Channel-Sensitive Scheduling method each are a method of applying an appropriate modulation and coding scheme at the most-efficient time determined depending on partial channel state information fed back from a receiver.

To realize the AMC method and the Channel-Sensitive Scheduling method, the receiver should feed back the channel state information to the transmitter. The channel state information that the receiver feeds back is referred to as 'Channel Quality Information (CQI)'.

Recently, intensive research is being conducted to replace Code Division Multiple Access (CDMA), the multiple access scheme used in the $2^{nd}$ and $3^{rd}$ Generation mobile communication systems, with Orthogonal Frequency Division Multiple Access (OFDMA) in the next generation system. 3GPP and 3GPP2 have started their standardizations on the evolved systems employing OFDMA. It is known that the OFDMA scheme, compared to the CDMA scheme, can expect a capacity increase. One of the several causes bringing about the capacity increase in the OFDMA scheme is that the OFDMA scheme can perform scheduling in the frequency domain (Frequency Domain Scheduling). As though the transceiver acquires capacity gain according to the time-varying channel characteristic using the Channel-Sensitive Scheduling method, the transceiver can obtain higher capacity gain with use of the frequency-varying channel characteristic. However, to support Frequency Domain Scheduling, the transmitter should previously acquire channel state information separately for each frequency. That is, the transmitter needs CQI feedback separately for each frequency, causing an increase in the CQI feedback load.

In the next generation system, intensive research is being conducted on the introduction of Multiple Input Multiple Output (MIMO) technology employing multiple transmit/receive antennas. The term 'MIMO' as used herein refers to a technology that simultaneously transmits multiple data streams over the same resources using multiple transmit/receive antennas. It is known that when the channel state is 'Good', it is possible to increase the throughput at the same error probability by transmitting multiple low-modulation order data streams rather than increasing the modulation order of the data streams.

In the MIMO technique, the dimension over which an individual data stream is transmitted is called as a 'layer', and the method that applies AMC separately according to the channel state of the layer is efficient in increasing the capacity. For example, Per Antenna Rate Control (PARC) is a technology in which every transmit antenna transmits a different data stream, and in this technology, the layer is a transmit antenna. Data streams transmitted via the multiple transmit antennas experience different channels, and the PARC technique applies AMC such that a larger amount of data can be transmitted via the transmit antenna having a good channel state and a less amount of data can be transmitted via the transmit antenna having a poor channel state. As another example, there is Per Common Basis Rate Control (PCBRC), and in this technology, the layer is a fixed transmission beam. Therefore, the PCBRC technique transmits a greater amount of data over the transmission beam with a good channel state, and transmits a less amount of data over the transmission beam with a poor channel state.

SUMMARY OF THE INVENTION

An aspect of the present invention is to provide a channel quality information transmission/reception method and apparatus capable of supporting both ready-made precoding and knockdown precoding without exceeding the limit on a structure of a feedback channel or the amount of information defined in the feedback channel in a MIMO mobile communication system.

Another aspect of the present invention is to support both a Transmit Diversity technology and an Antenna Selection Space Time Transmit Diversity (STTD) technology to which no precoding is applied in a MIMO mobile communication system.

Another aspect of the present invention is to provide a method and apparatus for feeding back CQI while indicating Antenna Selection STTD-dedicated CQI to use Antenna Selection STTD with a Transmit Diversity technology to which no precoding is applied, or closed-loop MIMO precoding in a mixed manner in a MIMO mobile communication system.

Yet another aspect of the present invention is to provide an information expression, feedback information decision and utilization method for each logical feedback channel and an apparatus thereof, capable of reporting Antenna Selection STTD-dedicated CQI taking into account the limit on the existing channel structure and the amount of information of r-sfch, r-bfch and r-mqich defined in a Ultra Mobile Broadband (UMB) system.

According to one aspect of the present invention, there is provided a method for transmitting feedback information by a mobile terminal in a mobile communication system. The method includes, when knockdown precoding is used and Antenna Selection precoding is used, setting an index field for indicating a universal matrix of a precoding matrix of a first reverse feedback channel to a value indicating report on Channel Quality Information (CQI) for Antenna Selection STTD; when the knockdown precoding is used and the Antenna Selection precoding is used, writing antenna selection information in a vector bitmap field of the first reverse feedback channel; when the knockdown precoding is used and the Antenna Selection precoding is used, estimating a CQI value according to the antenna selection information and writing the estimated CQI in a CQI field of a second reverse feedback channel; when the knockdown precoding is used and the Antenna Selection precoding is used, inserting a predetermined value in a Rank field of the second reverse feedback channel; and transmitting a signal of the first feedback channel including the index field and the antenna selection information and a signal of the second feedback channel including the CQI field, to a base station.

According to another aspect of the present invention, there is provided a method for receiving feedback information by a base station in a mobile communication system. The method includes receiving a first reverse feedback channel signal and a second reverse feedback channel signal from a mobile terminal that uses knockdown precoding as a precoding method and uses Antenna Selection precoding; reading a value set to indicate report on Channel Quality Information (CQI) for Antenna Selection STTD from an index field for indicating a universal matrix of a precoding matrix of the first reverse feedback channel signal; when the mobile terminal uses the knockdown precoding and uses the Antenna Selection precoding, acquiring antenna selection information from a vector bitmap field of the first reverse feedback channel; and when the mobile terminal uses the knockdown precoding and uses the Antenna Selection precoding, acquiring a CQI estimated according to the antenna selection information from a CQI field of the second reverse feedback channel.

According to another aspect of the present invention, there is provided an apparatus for transmitting feedback information in a mobile communication system. The apparatus includes a reverse feedback channel transmitter for transmitting a signal of a first reverse feedback channel and a signal of a second reverse feedback channel; and a controller for, when knockdown precoding is used and Antenna Selection precoding is used, setting an index field for indicating a universal matrix of a precoding matrix of the first reverse feedback channel to a value indicating report on Channel Quality Information (CQI) for Antenna Selection STTD, writing antenna selection information in a vector bitmap field of the first reverse feedback channel, estimating a CQI value according to the antenna selection information, writing the estimated CQI in a CQI field of the second reverse feedback channel, and inserting a predetermined value in a Rank field of the second reverse feedback channel.

According to yet another aspect of the present invention, there is provided an apparatus for receiving feedback information in a mobile communication system. The apparatus includes a reverse feedback channel receiver for receiving a first reverse feedback channel signal and a second reverse feedback channel signal from a mobile terminal that uses knockdown precoding as a precoding method and uses Antenna Selection precoding; and a controller for reading a value set to indicate report on Channel Quality Information (CQI) for Antenna Selection STTD from an index field for indicating a universal matrix of a precoding matrix of the first reverse feedback channel signal, acquiring antenna selection information from a vector bitmap field of the first reverse feedback channel, and acquiring a CQI estimated according to the antenna selection information from a CQI field of the second reverse feedback channel.

According to still another aspect of the present invention, there is provided a method for transmitting feedback information by a mobile terminal in a mobile communication system. The method includes, when knockdown precoding is used and Antenna Selection precoding is used, setting an index field for indicating a universal matrix of a precoding matrix of a first reverse feedback channel to a value indicating whether Antenna Selection STTD is present; when the knockdown precoding is used and the Antenna Selection precoding is used, writing antenna selection information in a vector bitmap field of the first reverse feedback channel; when the knockdown precoding is used and the Antenna Selection precoding is used, estimating Channel Quality Information (CQI) according to the antenna selection information and writing the estimated CQI in a CQI field of a second reverse feedback channel; when the knockdown precoding is used and the Antenna Selection precoding is used, inserting a predetermined value into a Rank field of the second reverse feedback channel; and transmitting a signal of the first feedback channel including the index field and the antenna selection information and a signal of the second feedback channel including the CQI field, to a base station.

According to still another aspect of the present invention, there is provided a method for receiving feedback information by a base station in a mobile communication system. The method includes receiving a first reverse feedback channel signal and a second reverse feedback channel signal from a mobile terminal that uses knockdown precoding as a precoding method and uses Antenna Selection precoding; reading a value set to indicate presence of Antenna Selection STTD from a index field for indicating a universal matrix of a precoding matrix of the first reverse feedback channel signal; when the mobile terminal uses the knockdown precoding and uses the Antenna Selection precoding, acquiring antenna selection information from a vector bitmap field of the first reverse feedback channel signal; and when the mobile terminal uses the knockdown precoding and uses the Antenna Selection precoding, acquiring a Channel Quality Information (CQI) estimated according to the antenna selection information, from a CQI field of the second reverse feedback channel signal.

According to still another aspect of the present invention, there is provided an apparatus for transmitting feedback information in a mobile communication system. The apparatus includes a reverse feedback channel transmitter for transmitting a signal of a first reverse feedback channel and a signal of a second reverse feedback channel; and a controller for, when knockdown precoding is used and Antenna Selection precoding is used, setting an index field for indicating a universal matrix of a precoding matrix of the first reverse feedback channel to a value indicating presence of Antenna Selection STTD, writing antenna selection information in a vector bitmap field of the first reverse feedback channel, estimating Channel Quality Information (CQI) according to the antenna selection information, writing the estimated CQI in a CQI field of the second reverse feedback channel, and inserting a predetermined value in a Rank field of the second reverse feedback channel.

According to still another aspect of the present invention, there is provided an apparatus for receiving feedback information in a mobile communication system. The apparatus includes a reverse feedback channel receiver for receiving a first reverse feedback channel signal and a second reverse feedback channel signal from a mobile terminal that uses knockdown precoding as a precoding method and uses Antenna Selection precoding; and a controller for reading a value set to indicate presence of Antenna Selection STTD from an index field for indicating a universal matrix of a precoding matrix of the first reverse feedback channel signal, acquiring antenna selection information from a vector bitmap field of the first reverse feedback channel signal, and acquiring a Channel Quality Information (CQI) estimated according to the antenna selection information from a CQI field of the second reverse feedback channel signal.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EMBODIMENTS OF THE PRESENT INVENTION

Figure 1:
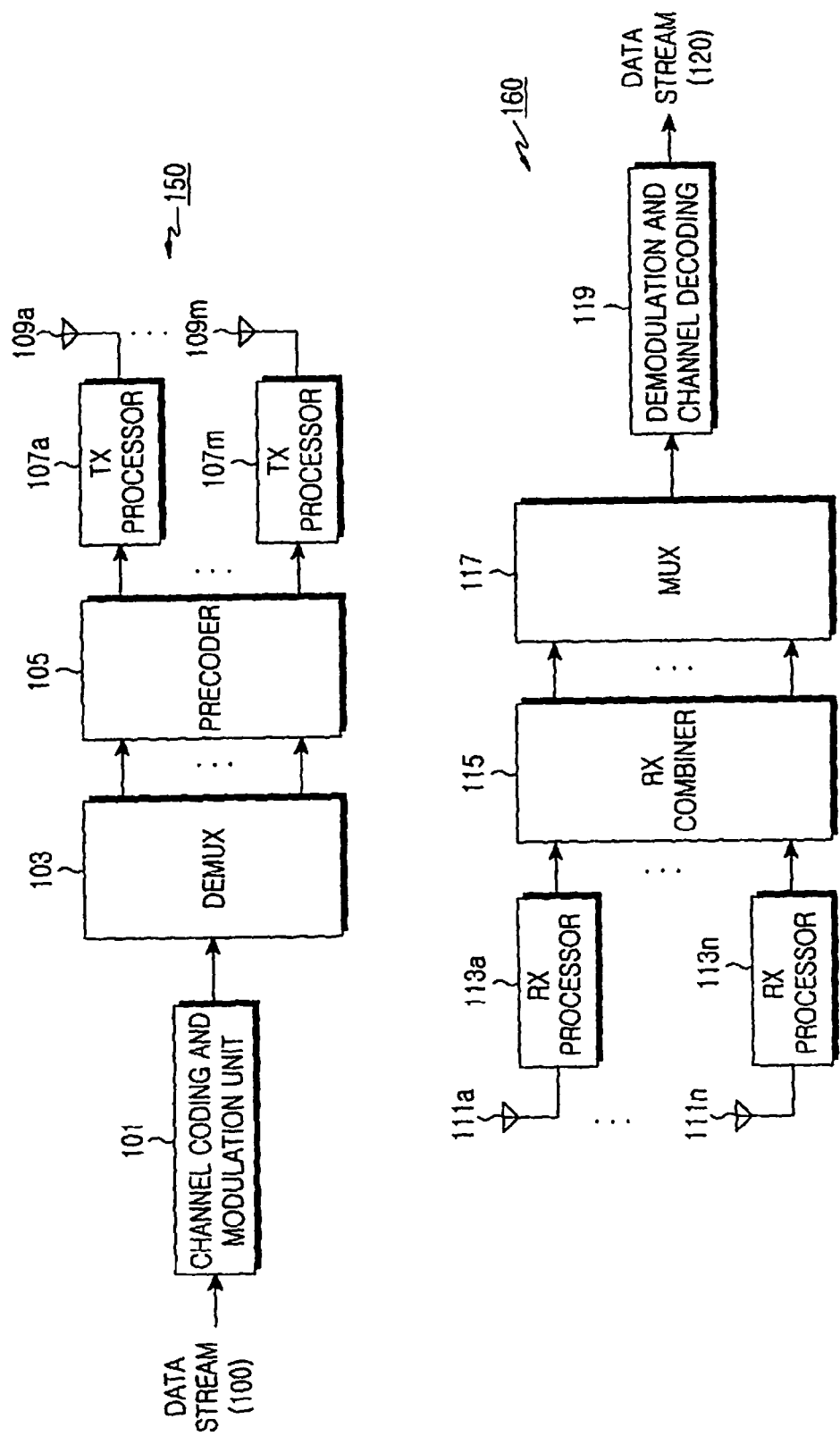
FIG. 1 is a diagram illustrating a structure of an SCW MIMO transceiver.

Preferred embodiments of the present invention will now be described in detail with reference to the annexed drawings.

In the drawings, the same or similar elements are denoted by the same reference numerals even though they are depicted in different drawings. The matters defined in the description such as a detailed construction and elements are provided to assist in a comprehensive understanding of exemplary embodiments of the invention. In the following description, a detailed description of known functions and configurations incorporated herein has been omitted for clarity and conciseness.

For a better understanding of the present invention, a description will now be made of a method for feeding back a channel quality indicator in a MIMO mobile communication system.

First, a description will be made of a system using multiple antennas.

When MIMO is realized with multiple antennas, a precoding method is used for adaptively forming transmission beams according to the channel state. The term 'precoding' as used herein refers to an operation in which a transmitter pre-distorts transmission signals before the stage of transmitting signals via transmit antennas. If the precoding is realized with linear combining, the precoding process can be expressed as Equation (1).

$$x = Es \qquad (1)$$

where 's' is a K×1 vector, and denotes a desired transmission signal, and 'x' is an M×1 vector, and denotes an actual transmission signal. However, K denotes the number of symbols simultaneously transmitted by MIMO over the same resources, and M denotes the number of transmit antennas. Further, E is an N×K matrix, and denotes precoding, and N denotes the number of receive antennas. That is, Equation (1) indicates that a MIMO transmitter with M transmit antennas applies a precoding scheme, called E, when it simultaneously transmits K signal streams.

A precoding matrix E is adaptively determined according to a transmission MIMO channel. However, when the transmitter cannot acquire information on the transmission MIMO channel, it performs precoding according to feedback information reported by the receiver. To this end, a precoding codebook including a finite number of precoding matrixes E is preset between the transmitter and the receiver. The receiver selects the precoding matrix E most preferred in the current channel state from this precoding codebook, and feeds it back to the transmitter. Then the transmitter performs MIMO transmission by applying the precoding.

The transmission signal of Equation (1), received over a MIMO channel H, is expressed as Equation (2).

$$y = Hx + z = HEs + z \qquad (2)$$

where y and z each are an N×1 vector, and denote a signal and a noise signal received at N receive antennas, respectively, and H is an N×M matrix, and denotes a MIMO channel. The received signal undergoes a reception combining process so that a Signal-to-Interference and Noise Ratio (SINR) of a transmission signal stream of each layer may be improved. The signal r that underwent the reception combining process is defined as Equation (3).

$$r = Wy = WHx + Wz = WHEs + Wz \qquad (3)$$

where W is an N×N matrix, and denotes the reception combining process, and r is an N×1 signal vector. To more correctly receive a transmission signal stream of each layer, it is possible to additionally use a reception technique such as interference cancellation and/or Maximum Likelihood (ML) reception.

The MIMO technique can be classified into a Single Code-Word (SCW) scheme and a Multi-CodeWord (MCW) scheme according to the number of coded packets from which multiple signal streams transmitted by MIMO technique are generated.

FIG. 1 is a diagram illustrating a structure of an SCW MIMO transceiver.

Referring to FIG. 1, in a transmitter 150, a desired transmission data stream 100 is converted into one coded packet signal stream after undergoing a channel coding and modulation process in a channel coding and modulation unit 101. For MIMO transmission, the signal stream output from the channel coding and modulation unit 101 is input to a demultiplexer 103 where it is demultiplexed into K signal streams. The demultiplexed K signal streams are linear-converted into M signal streams to be transmitted via associated transmit antennas, after passing through a precoder 105, and this process can be considered as a process where K signal streams are transmitted over different transmission beams. The precoded M signal streams are transmitted via transmit antennas 109a through 109m by way of associated transmission processors 107a through 107m, respectively. It will be assumed that the transmission processors 107a through 107m each perform not only the process of generating a CDMA or OFDMA signal, but also the filtering or Radio Frequency (RF) processing process performed at each antenna. The signals transmitted by the transmitter 150 are received at N receive antennas 111a through 111n of a receiver 160, and the signals received at the receive antennas are restored to baseband signals by means of associated reception processors 113a through 113n. The signals reception-processed by the reception processors 113a through 113n undergo reception combining at a reception combiner 115, and are then restored to the original desired transmission signal stream after undergoing multiplexing in a multiplexer 117. Finally, the original desired transmission data stream 120 is restored by means of a demodulation and channel decoding unit 119 after undergoing demodulation and channel decoding.

According to the SCW MIMO characteristic, because the SCW MIMO transmitter generates multiple transmission signal streams by applying one channel coding and modulation unit 101, it only needs to receive one CQI feedback. However, the number of MIMO-transmitted transmission signal streams, i.e., the number K of MIMO layers over which the signal streams are transmitted, should be adjusted according to the channel state. The number K of MIMO layers over which the signal streams are transmitted is referred to herein as 'Rank'. Therefore, the feedback of SCW MIMO is composed of one CQI representative of the channel state of transmission MIMO layers, and the number 'Rank' of transmission layers. That is, Rank indicates the number of activated layers.

Figure 2:
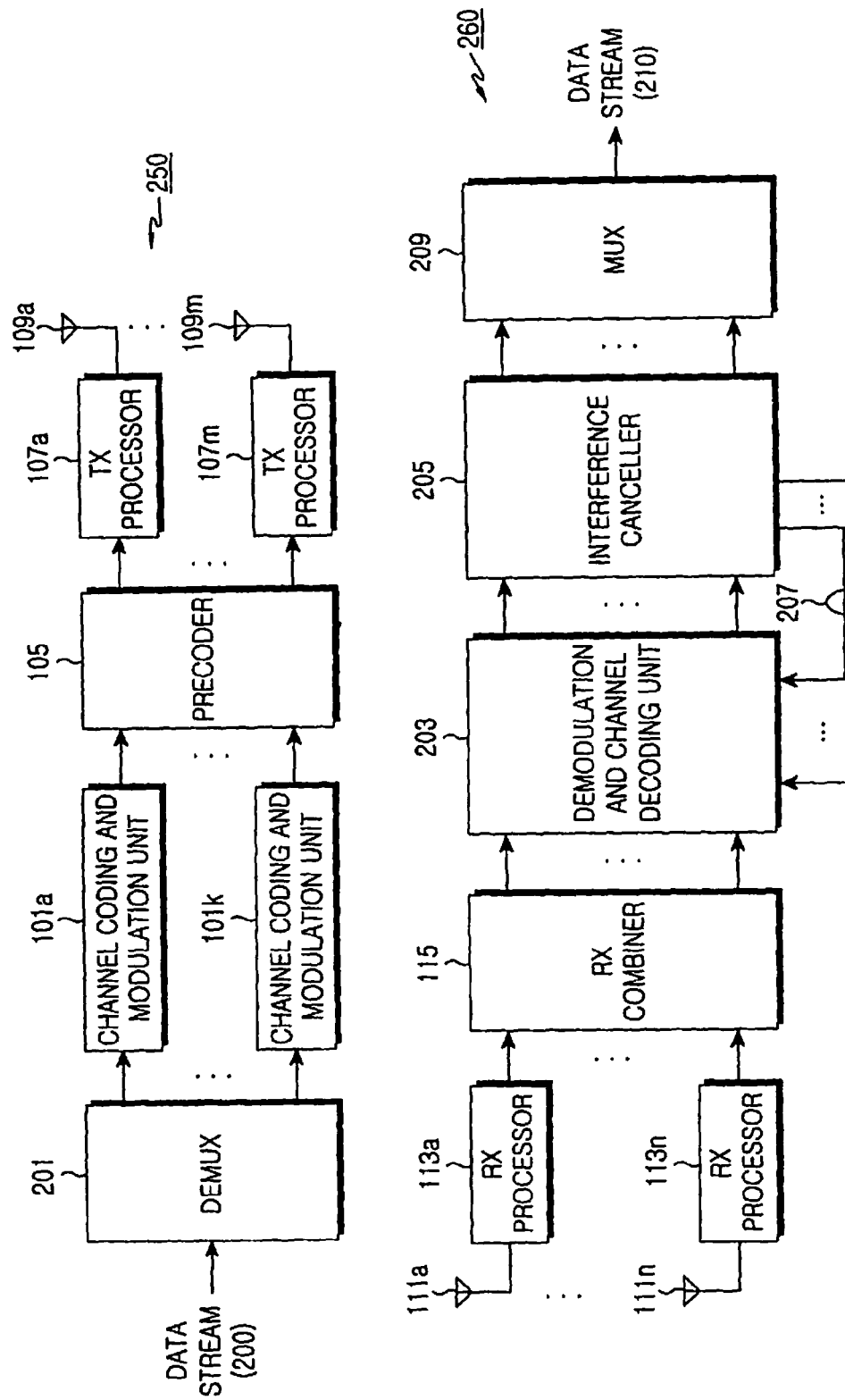
FIG. 2 is a diagram illustrating a structure of an MCW MIMO transceiver.

FIG. 2 is a diagram illustrating a structure of an MCW MIMO transceiver.

The MCW MIMO transceiver, unlike the SCW MIMO transceiver, transmits different coded packet signal streams over different MIMO layers. Therefore, in a transmitter 250, a desired transmission data stream 200 is demultiplexed into as many signal streams as Rank in a demultiplexer 201, and the demultiplexed signal streams are converted into signal streams of associated MIMO layers after undergoing channel coding and modulation by way of different channel coding and modulation units 101a through 101k, respectively. The following transmission process is the same as that of the SCW MIMO transceiver, and the signals to be transmitted via M transmit antennas 109a and 109m are generated by way of the precoding process 105 where they undergo a precoding process, and the transmission processors 107a through 107m of their associated transmit antennas. A reception process of the MCW MIMO transceiver is also the same as the reception process of the SCW MIMO transceiver in several steps immediately after the signal reception.

Although the receiver 260 uses an interference canceller 205 in FIG. 2, by way of example, the receiver can use other types of reception methods. The signals received at N receive antennas 111a through 111n are restored to the transmission signals of associated layers after passing through reception processors 113a through 113n, and a reception combiner 115 in order. The restored signals include mutual interferences.

In MCW MIMO, because the transmission signals have undergone different channel coding and modulation separately for each layer, the receiver 260 can cancel the first restored signal of a particular layer to remove the interference effect that the corresponding signal renders to other layers. The use of the interference canceller 205 can improve channel capacities of the MIMO layers, so it is possible to transmit a larger amount of data through the MCW MIMO transmission.

A reception process based on the interference cancellation will be described below. When a signal of one layer is successfully restored by means of a demodulation and channel decoding unit 203, the interference canceller 205 cancels the interference using the restored signal. The interference-canceled signal stream 207 is delivered back to the demodulation and channel decoding unit 203, and the restoration and interference cancellation are repeated until signals of all layers are successfully restored and/or there is no more signal of layers to be restored. Finally, the restored multiple signal streams of associated layers are restored to one desired transmission data stream 210 by means of a multiplexer 209.

According to the MCW MIMO characteristic, because the MCW MIMO transmitter generates multiple transmission signal streams by applying multiple channel coding and modulation units 101a through 101k separately for associated layers, it should receive CQI feedback separately for their associated layers. As to the Rank, it can be expressed in an imminent way by setting a predetermined CQI value indicating 'No Transmission' among CQI values, rather than separately feeding it back. Therefore, the feedback of MCW MIMO is composed of multiple CQIs representative of channel states of associated transmission MIMO layers.

A method for forming and expressing precoding can be classified into a knockdown method and a ready-made method.

The knockdown method has multiple universal matrixes, designates one of the universal matrixes, and selects particular column vectors of the designated universal matrix to make a detailed precoding method. For example, when the knockdown method has two matrixes U1 and U2 as universal matrixes, and selects column vectors #1 and #3 of the matrix U1 to form two layers for MIMO transmission, the precoding matrix is defined as E=[U1(:,1), U1(:,3)], where A(:,i) denotes an $i^{th}$ column vector of a matrix A. To express the precoding matrix formed by the knockdown method, MCW MIMO uses a universal matrix index indicating which universal matrix is selected.

The selection/non-selection of column vectors can be expressed by means of a Packet Format of each layer. The Packet Format is used for indicating a modulation scheme and a channel coding scheme when AMC is realized, and one of Packet Formats is set to 'Null' to express 'No Transmission' of data. In this manner, even though the information indicating which column vector is selected is not provided by a separate scheme, MCW MIMO can distinguish the activated column vectors from the inactivated column vectors using the Null Packet Format.

SCW MIMO, to express the precoding matrix formed by the knockdown method, needs not only the universal matrix index but also the vector bitmap indicating which column vector is selected. As to the vector bitmap, there is a bitmap corresponding to a column length of the universal matrix. When its $n^{th}$ bit is set to '1', it indicates that an $n^{th}$ column vector is selected, and when the $n^{th}$ bit is set to '0', it indicates that the $n^{th}$ column vector is not selected.

The ready-made method establishes multiple precoding matrixes and selects one of the precoding matrixes. It is necessary to adjust Rank even with the ready-made method. While the knockdown method adjusts Rank by designating which column vector of the selected universal matrix is selected, the ready-made method adjusts Rank by designating only the Rank value. Once Rank is designated, the ready-made method selects a first column vector through a (Rank)$^{th}$ column vector of the selected precoding matrix. MCW MIMO uses a matrix index for selecting a precoding matrix in order to express the precoding matrix formed by the ready-made method. SCW MIMO uses a matrix index and a Rank value to express the precoding matrix formed by the ready-made method.

One example of the simple precoding methods based on the knockdown method can include binary unitary precoding for Antenna Selection MIMO. For the universal matrix defined by the knockdown method, only one identity matrix I is defined. The identity matrix is a matrix in which all diagonal components are '1' and the remaining components are '0'. The knockdown precoding scheme having only the identity matrix as the universal matrix precodes an $n^{th}$ column vector in the way of carrying a signal on an $n^{th}$ transmit antenna without distortion and carrying no signal on the remaining transmit antennas. That is, in the knockdown method, the vector bitmap indicates which transmit antenna the knockdown method selects. For this reason, the knockdown precoding technique using the binary unitary precoding is called 'Antenna Selection MIMO'. Therefore, Antenna Selection MIMO has the same meaning as an Antenna Selection technique for MIMO transmission.

Antenna Selection Space Time Transmit Diversity (STTD), like the Antenna Selection MIMO, is a technology that selects a transmit antenna and transmits signals only via the selected antenna. However, while Antenna Selection MIMO has no limitation on the number of selected transmit antennas and sends signals of different MIMO layers via the selected transmit antennas separately, Antenna Selection STTD limits the number of selected transmit antennas to 2, and applies STTD using the two selected transmit antennas. That is, Antenna Selection STTD is characterized by selecting only two antennas for STTD. STTD is designed to transmit one data stream with the Alamouti coding-based Transmit Diversity technique. STTD is also called 'orthogonal spatial coding' because it is characterized by arranging transmission complex symbols as shown in 'Equation (4) so that orthogonality between transmission symbols may be maintained in any space channel.

$$\begin{bmatrix} S_i & -S_{i+1}^* \\ S_{i+1} & S_i^* \end{bmatrix} \quad (4)$$

where $S_i$ denotes an $i^{th}$ symbol of a data stream. In the matrix of Equation (4), rows are antenna dimensions and columns are time dimensions. That is, in a first symbol time, $S_i$ is transmitted at a first transmit antenna, and $S_{i+1}$ is transmitted at a second transmit antenna. In the next symbol time, $-S^*_{i+1}$ is transmitted at the first transmit antenna, and $S^*_i$ is transmitted at the second transmit antenna. In this manner, STTD forms the symbol matrix of Equation (4) in space and time. Because the OFDM system can transmit different symbols not only in time but also in frequency, the columns can be frequency dimensions in the matrix of Equation (4).

Figure 3:
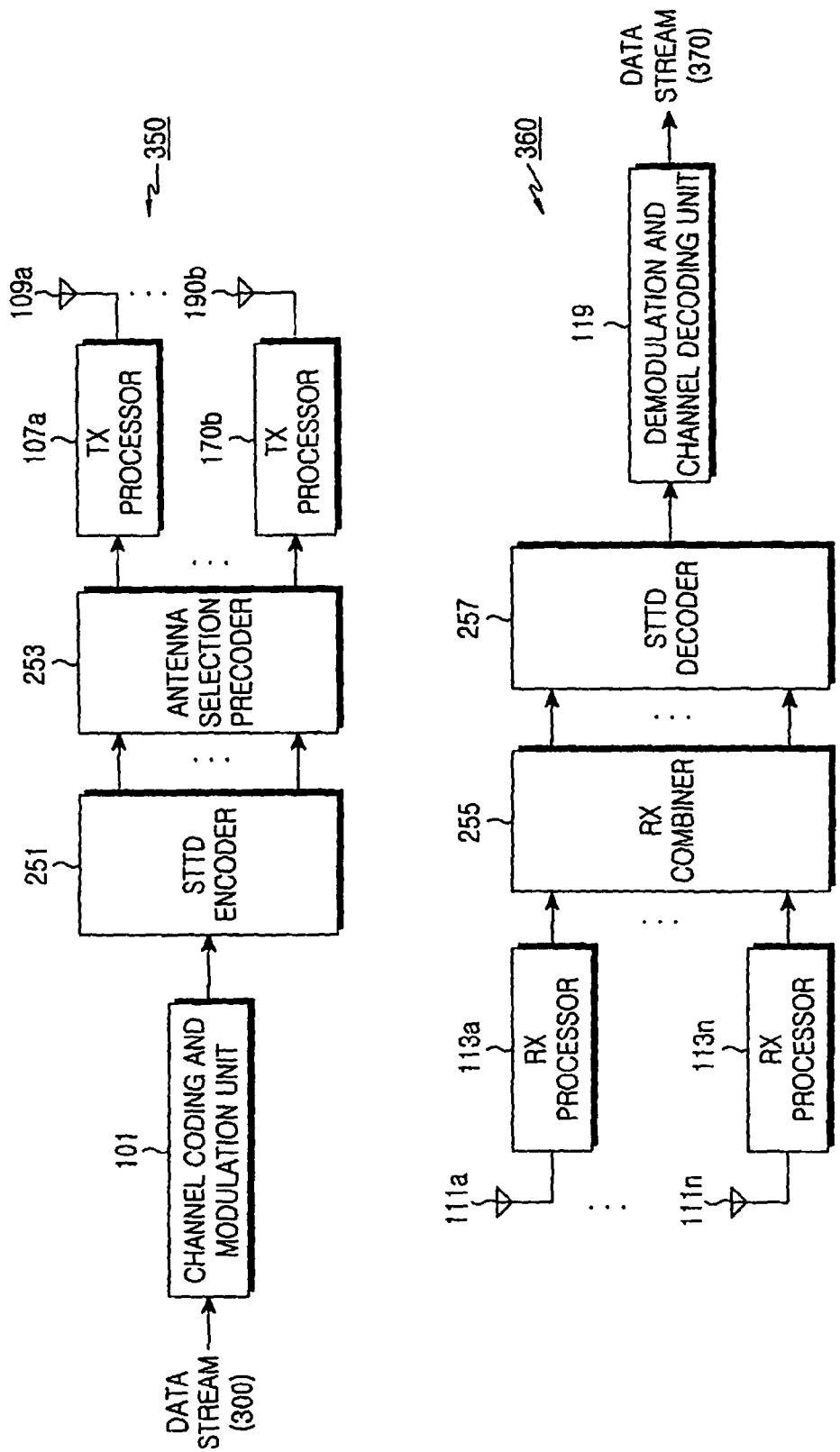
FIG. 3 illustrates a structure of a transceiver employing Antenna Selection STTD.

FIG. 3 illustrates a structure of a transceiver 350 and 360 employing Antenna Selection STTD. In the transmitter 350, a desired transmission data stream 300 is converted into one coded packet signal stream after undergoing a channel coding and modulation unit 101. This signal stream is converted into the form of signal streams to be transmitted via two transmit antennas after undergoing an STTD encoder 251. To realize Antenna Selection STTD, the transceiver performs Antenna Selection precoding at an Antenna Selection precoder 253. Herein, however, the number of selected antennas is 2 so as to apply STTD. That is, the two spatial signal streams generated by the STTD encoder 251 are transferred to the selected two transmit antennas 109a and 190b via transmission processors 170a and 170b, respectively. The signals received at multiple receive antennas 111a and 111n are combined into one signal stream by a reception combiner 255 after passing through reception processors 113a and 113n, respectively. This one signal stream is a signal obtained by linearly combining the STTD signal streams transmitted from two transmit antennas. An STTD decoder 257 separates the signal streams combined in one signal stream using orthogonality therebetween. The separated signal streams are restored to a transmission data stream 370 by way of a demodulation and channel decoding unit 119.

An Ultra Mobile Broadband (UMB) system, now under discussion in 3GPP2, is designed so as to support OFDMA and MIMO, and its feedback control signal is designed so as to support both SCW MIMO and MCW MIMO. Logical feedback channels associated with a MIMO operation are classified into a reverse MIMO quality indication channel (r-mqich), a reverse beam index feedback channel (r-bfch), and a reverse subband feedback channel (r-sfch).

Feedback information carried by each logical channel is as follows. First, r-sfch is composed of information of a total of 8 bits, including a 4-bit subband index and a 4-bit subband delta CQI field. Herein, the subband index field, as it indicates a value for which subband a subband CQI indicated by r-sfch indicates, means an index of a subband with a good channel quality, selected by a mobile terminal that transmits the feedback information. A value written in the subband delta CQI field is a delta CQI determined taking both precoding gain and subband gain into account, and a CQI precoded in a subband designated by a subband index of the subband index field can be found by adding the subband delta CQI to the CQI written in the CQI field of r-mqich.

Meanwhile, r-bfch is composed of information of a total of 8 bits, including a 6-bit precoder index field and a 2-bit Spatial Domain Multiple Access (SDMA) CQI field. Information indicating which precoding method is preferred is written in the precoder index field, and information indicating a level of a CQI reduction occurring when the system operates not in MIMO, but in SDMA, or indicating a level of CQI improvement expected in SCW MIMO when SDMA operates as a default mode, is written in the SDMA CQI field.

Finally, r-mqich has information, the amount of which is defined differently according to two MIMO modes: SCW MIMO and MCW MIMO. In the SCW MIMO mode, r-mqich is composed of information of a total of 7 bits, including a 5-bit SCW MIMO CQI field and a 2-bit Rank field. In the MCW MIMO mode, r-mqich is composed of information of four 4-bit MCW MIMO CQIs so as to transmit a maximum of 4 CQIs.

The feedback information of each logical channel can be summarized as shown in Table 1.

TABLE 1

| Logical channels | Fields | # of bits |
|---|---|---|
| r-sfch | Subband Index | 4 |
|  | Subband delta CQI | 4 |
| r-bfch | Precoder Index | 6 |
|  | SDMA CQI | 2 |
| r-mqich (SCW) | SCW MIMO CQI | 5 |
|  | Rank | 2 |
| r-mqich (MCW) | MCW MIMO CQI (layer 1) | 4 |
|  | MCW MIMO CQI (layer 2) | 4 |
|  | MCW MIMO CQI (layer 3) | 4 |
|  | MCW MIMO CQI (layer 4) | 4 |

The problem in the foregoing mobile communication system supporting MIMO is in that definitions of the feedback information are limited to the case where the feedback channels use the ready-made precoder. The mobile communication system supporting MIMO should not only be able to support both of the ready-made precoding method and the knockdown precoding method, but also be able to support both of a Transmit Diversity technology to which no precoding method is applied and an Antenna Selection STTD technology only with the definition of information, without modification of the conventional feedback channels. This is because the above various multi-antenna technologies have their own advantages according to the environments.

Therefore, in the following description, the present invention provides embodiments not only capable of supporting both of the ready-made precoding and the knockdown precoding without exceeding the limit on the structure of the feedback channels and the amount of information defined in the feedback channels, but also capable of supporting both of the Transmit Diversity technology to which no precoding is applied, and the Antenna Selection STTD technology.

Further, in order to use Antenna Selection STTD with the STTD technique and the closed-loop MIMO precoding method in a mixed manner, it is necessary to feed back CQI while indicating Antenna Selection STTD-dedicated CQI. In addition, the present invention provides information expression, feedback information decision and utilization method for each logical feedback channel and an apparatus thereof, capable of reporting Antenna Selection STTD-dedicated CQI taking into account the limit on the existing channel structure and the amount of information of r-sfch, r-bfch and r-mqich defined in the 3GPP2 UMB system.

The present invention herein provides a scheme of determining activation/inactivation of logical channels including r-sfch, r-bfch and r-mqich for feedback of UMB supporting MIMO, and differently analyzing CQIs included in the logical channels according to particular feedback information.

A description will first be made of a method for analyzing CQIs included in the logical channels according to the activation/inactivation of each logical channel.

When only the r-mqich among the logical channels is activated, the CQI to which no precoding is applied in the broadband, or the CQI for the precoding arbitrarily applied by the base station is fed back over the r-mqich.

When only the r-bfch and r-mqich among the logical channels are activated, the CQI to which no precoding is applied in the broadband is fed back over the r-mqich, and the r-bfch is used for notifying the corresponding precoding method applied in the broadband.

When only the r-sfch and r-mqich among the logical channels are activated, the CQI to which no precoding is applied in the broadband, or the CQI for the precoding arbitrarily applied by the base station is fed back over the r-mqich, and the subband delta CQI reported to notify the subband preferred by the mobile terminal and the CQI in the subband is reported over the r-sfch. In this case, the CQI in the subband is a value obtained by adding the subband delta CQI of r-sfch to the CQI of r-mqich.

When all of the logical channels are activated, the CQI information to which no precoding is applied in the broadband, or the CQI information for the precoding arbitrarily applied by the base station is fed back over the r-mqich, the subband delta CQI used for notifying the subband preferred by the mobile terminal and the CQI precoded in the preferred subband is fed back over the r-sfch, and the precoding method considered for obtaining the CQI in the subband is fed back over the r-bfch.

The expression 'no precoding is applied' means that Delay Diversity or predetermined Transmit Diversity is applied. STTD can be used as the predetermined Transmit Diversity. Herein, STTD is different from Antenna Selection STTD. For example, when there are 4 transmit antennas, Antenna Selection STTD selects two of them and applies STTD thereto. However, STTD uses all of the 4 transmit antennas, and applies the Space-Time Coding of Equation (5) or Equation (6) according to the rate.

$$\begin{bmatrix} S_i & -S_{i+1}^* & 0 & 0 \\ S_{i+1} & S_i^* & 0 & 0 \\ 0 & 0 & S_{i+2} & -S_{i+3}^* \\ 0 & 0 & S_{i+3} & S_{i+2}^* \end{bmatrix} \quad (5)$$

$$\begin{bmatrix} S_i & -S_{i+1}^* & S_{i+4} & -S_{i+6}^* \\ S_{i+1} & S_i^* & S_{i+5} & -S_{i+7}^* \\ S_{i+2} & -S_{i+3}^* & S_{i+6} & S_{i+4}^* \\ S_{i+3} & S_{i+2}^* & S_{i+7} & S_{i+5}^* \end{bmatrix} \quad (6)$$

Because no increase in the data rate has occurred with STTD of Equation (5), Equation (5) corresponds to STTD rate-1. Because the data rate increases two times with STTD of Equation (6), Equation (6) corresponds to STTD rate-2.

As described above, 6-bit precoding information is defined in the r-bfch among the logical channels. For the ready-made precoding method, all of the 6 bits are used for indicating a precoding matrix. However, when the knockdown precoding method is used, 1 bit (or 2 bits) among the 6 bits is used for designating a universal matrix, and the bits corresponding in number to the column size of the universal matrix, among the remaining bits, are used as a vector bitmap indicating antenna selection information.

The ready-made precoding scheme cannot generate the actual precoding matrix only with the precoding information of r-bfch. To generate the actual precoding matrix, Rank information of r-mqich should be used. Although r-mqich has room prepared for the Rank information in SCW MIMO, the number of CQIs rather than NULL CQI is Rank in MCW MIMO. That is, Rank information is written in r-mqich extrinsically in SCW MIMO, but imminently in MCW MIMO. The term 'NULL CQI' as used herein means an order not to carry a signal stream on the corresponding beam, virtual antenna, and/or logical antenna. For example, when a total of 4 transmission beams are generated and 2 NULL CQIs are reported, only 2 beams are used for transmission and the remaining 2 beams are unused. The available power is uniformly allocated to the 2 transmission beams. For Rank=r, submatrixes of a first column vector through an $r^{th}$ column vector in a precoding matrix indicated by precoding information of r-bfch are selected. These submatrixes become the actual precoding matrix.

However, the knockdown precoding scheme can generate an actual precoding matrix only with the precoding information of r-bfch. After first selecting a universal matrix, if the knockdown precoding scheme generates submatrixes so as to activate only the column vectors designated by a vector bitmap, the submatrixes become the actual precoding matrix.

The binary unitary precoding, one of the knockdown precoding schemes, is for realizing an Antenna Selection MIMO operation. The vector bitmap is used for feeding back antenna selection information. Not only the vector bitmap but also the universal matrix index are defined in a precoder index of r-bfch among the feedback channels to support the knockdown precoding scheme, but the Antenna Selection MIMO operation no longer needs the universal matrix index. Therefore, the unused universal matrix index is used for other purposes, or used as a reserved value.

For the system supporting Antenna Selection STTD among the multi-antenna technologies, a mobile terminal should be able to feed back CQI information that can be obtained with use of Antenna Selection STTD. Since feedback of the CQIs for both the case where precoding is used and the case where no precoding is used are supported as described above, it is necessary to distinguish the CQI feedback from the CQI feedback of Antenna Selection STTD. By defining Antenna Selection STTD as one of Antenna Selection MIMO operations, it is possible to specify the feedback of a CQI for Antenna Selection STTD using the unused universal matrix index.

In sum, in SCW MIMO using knockdown precoding techniques, especially using the binary unitary precoding or the Antenna Selection precoding among them, the universal matrix index among the precoder indexes of r-bfch is used as information indicating whether the CQI transmitted over r-mqich is a CQI by Antenna Selection STTD or a CQI by Antenna Selection MIMO.

Figure 4A:
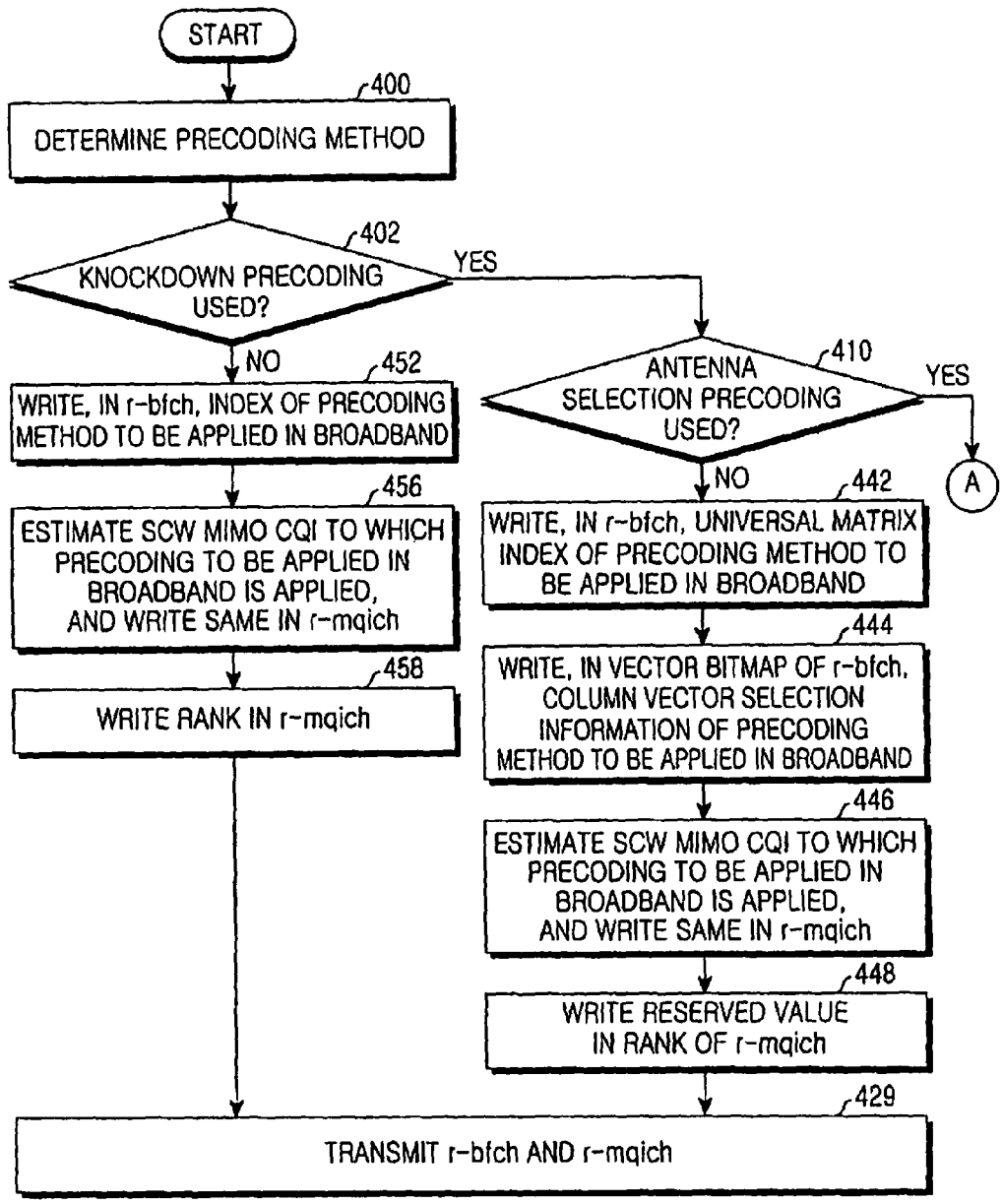
FIG. 4 is a diagram illustrating a process in which a mobile terminal transmits MIMO-related feedback information when r-bfch and r-mqich are activated in an SCW MIMO mode according to an embodiment of the present invention.
Figure 4B:
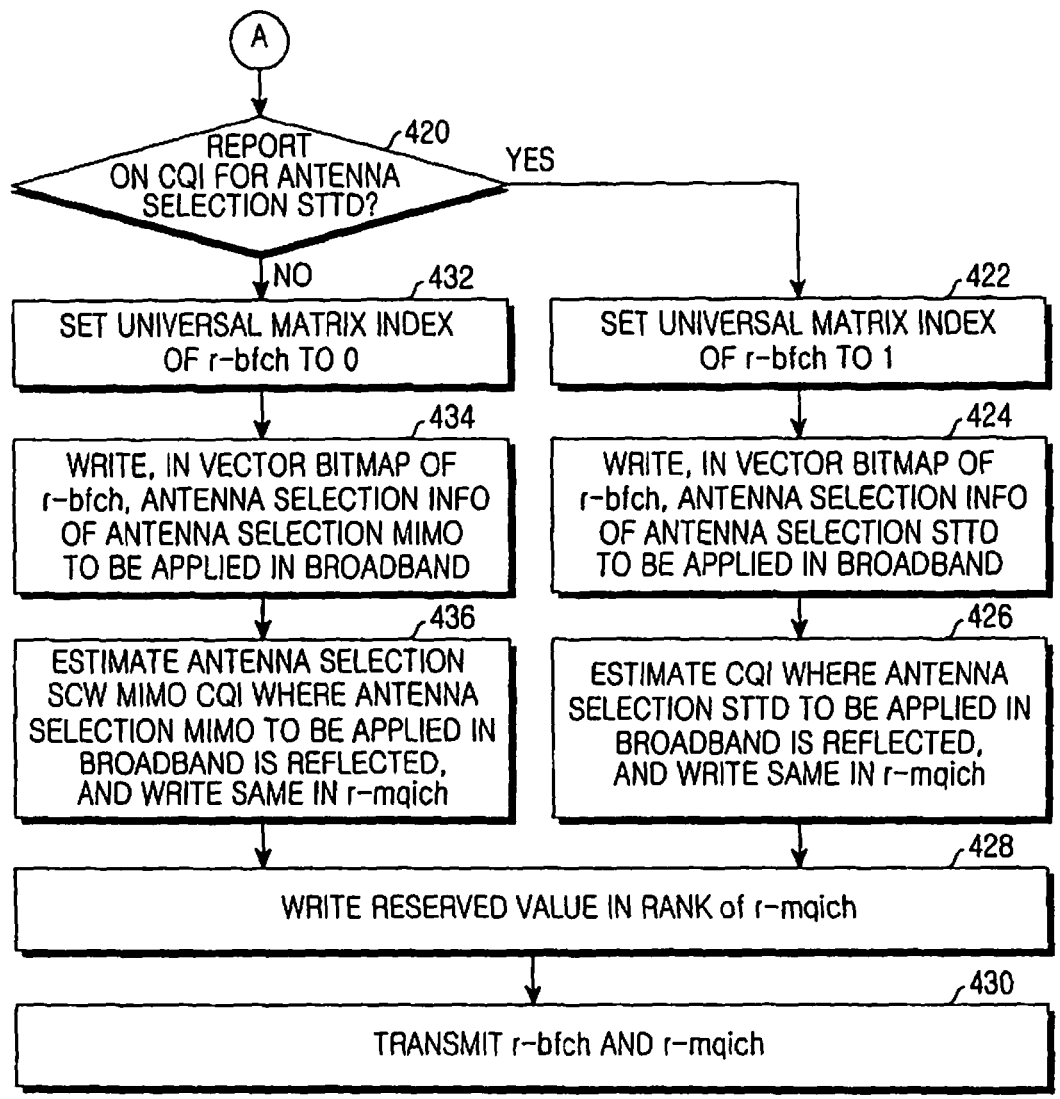

FIG. 4 is a diagram illustrating a process in which a mobile terminal transmits MIMO-related feedback information when r-bfch and r-mqich are activated in an SCW MIMO mode according to an embodiment of the present invention.

A mobile terminal determines a precoding method in step 400. The mobile terminal determines in step 402 whether it uses a knockdown precoding method. The mobile terminal can determine whether it uses a knockdown precoding method or a ready-made precoding method depending on the preset information agreed upon between the mobile terminal and the base station by upper layer signaling. If it is determined in step 402 that it uses knockdown precoding, the mobile terminal determines in step 410 whether the knockdown precoding is Antenna Selection precoding, i.e., binary unitary precoding, or the normal knockdown precoding. Similarly, the mobile terminal can determine the type of the knockdown precoding method in use depending on the preset information agreed upon between the mobile terminal and the base station by upper layer signaling.

If it is determined in step 410 that the mobile terminal has agreed to use Antenna Selection precoding, the mobile terminal determines in step 420 whether it intends to report a CQI assumed for Antenna Selection STTD transmission, i.e., CQI for Antenna Selection STTD, or it intends to report a CQI assumed for Antenna Selection MIMO transmission, i.e., CQI for Antenna Selection MIMO. If the mobile terminal intends to report a CQI for Antenna Selection STTD, the mobile terminal sets, to '1', a universal matrix index for indicating a universal matrix of a precoding matrix among the precoder index fields in r-bfch in step 422, and writes antenna selection information of Antenna Selection STTD to be applied in a broadband, in a vector bitmap field of r-bfch in step 424. The antenna selection information written in step 424 indicates antennas selected for Antenna Selection STTD. Herein, however, the number of selected antennas should necessarily be 2. Otherwise, since the transmitter (base station) cannot apply STTD, such feedback is meaningless.

In step 426, the mobile terminal estimates a CQI where Antenna Selection STTD to be applied in the broadband is reflected, and writes the value in a CQI field of r-mqich. Thereafter, in step 428, the mobile terminal writes a predetermined reserved value in a Rank field of r-mqich. This is because as Antenna Selection STTD transmission transmits the same data stream over the same time-frequency resources, the Rank information is meaningless. In step 430, the mobile terminal transmits the feedback information of r-bfch and r-mqich, generated through the above process.

However, if it is determined in step 420 that the mobile terminal intends to report a CQI for Antenna Selection MIMO, the mobile terminal sets, to '0', a universal matrix index for indicating a universal matrix of a precoding matrix, among the precoder index fields in r-bfch in step 432, and writes antenna selection information of Antenna Selection MIMO to be applied in the broadband, in a vector bitmap field of r-bfch in step 434. The antenna selection information of Antenna Selection MIMO indicates the antennas selected for the Antenna Selection MIMO transmission.

In step 436, the mobile terminal estimates an Antenna Selection SCW MIMO CQI where the Antenna Selection MIMO to be applied in the broadband is reflected, and writes the value in a CQI field of r-mqich. In step 428, the mobile terminal writes a predetermined reserved value in a Rank field of r-mqich. Thereafter, in step 430, the mobile terminal transmits the feedback information of r-bfch and r-mqich, generated through the above process. Herein, the feedback information is the values written in the fields of r-bfch and r-mqich before being transmitted.

Although it is assumed herein that the mobile terminal sets a value indicating whether it intends to report a CQI for Antenna Selection STTD in a universal matrix index for indicating a universal matrix of precoding matrix among the precoder index fields in r-bfch according to whether it intends to report a CQI for Antenna Selection STTD in step 420, the mobile terminal can perform the same operations as above even according to the presence of Antenna Selection STTD or the use of Antenna Selection STTD.

That is, the present invention can perform the succeeding operation according to 'presence of Antenna Selection STTD' or 'use of Antenna Selection STTD' other than the condition 'report on CQI for Antenna Selection STTD' of step 420 in FIG. 4. For example, if Antenna Selection STTD is present in step 420, the mobile terminal will set a universal matrix index in a precoding index field of r-bfch to '1' in step 422, and if Antenna Selection STTD is not present, the mobile terminal will set a universal matrix index in the precoding index field of r-bfch to '0' in step 432.

Therefore, 'report on CQI for Antenna Selection STTD', 'presence of Antenna Selection STTD' and 'use of Antenna Selection STTD' all will be used herein as the same expression.

However, if it is determined in step 410 that the normal knockdown precoding other than Antenna Selection precoding is used, the mobile terminal writes a universal matrix index of a precoding method to be applied in the broadband, in a precoder index field of r-bfch in step 442. In step 444, the mobile terminal writes column vector selection information of a universal matrix indicated by the universal matrix index written in step 442, in a vector bitmap field of r-bfch. In step 446, the mobile terminal estimates an SCW MIMO CQI for the case where such precoding is applied, and writes the value in a CQI field of r-mqich. Since the knockdown precoding does not need to separately provide Rank information, the mobile terminal writes a predetermined reserved value in a Rank field of r-mqich in step 448. Thereafter, in step 429, the mobile terminal transmits the feedback information of r-bfch and r-mqich, generated through the above process.

However, if it is determined in step 402 that the mobile terminal uses ready-made precoding, the mobile terminal writes a matrix index of a precoding method to be applied in the broadband, in a precoder index field of r-bfch in step 452. Thereafter, in step 456, the mobile terminal estimates an SCW MIMO CQI for the case where such precoding is applied, and writes the value in a CQI field of r-mqich. Since the ready-made precoder has no need to separately provide Rank information, the mobile terminal writes the value in a Rank field of r-mqich in step 458. Thereafter, in step 429, the mobile terminal transmits the feedback information of r-bfch and r-mqich, generated through the above process.

Figure 5A:
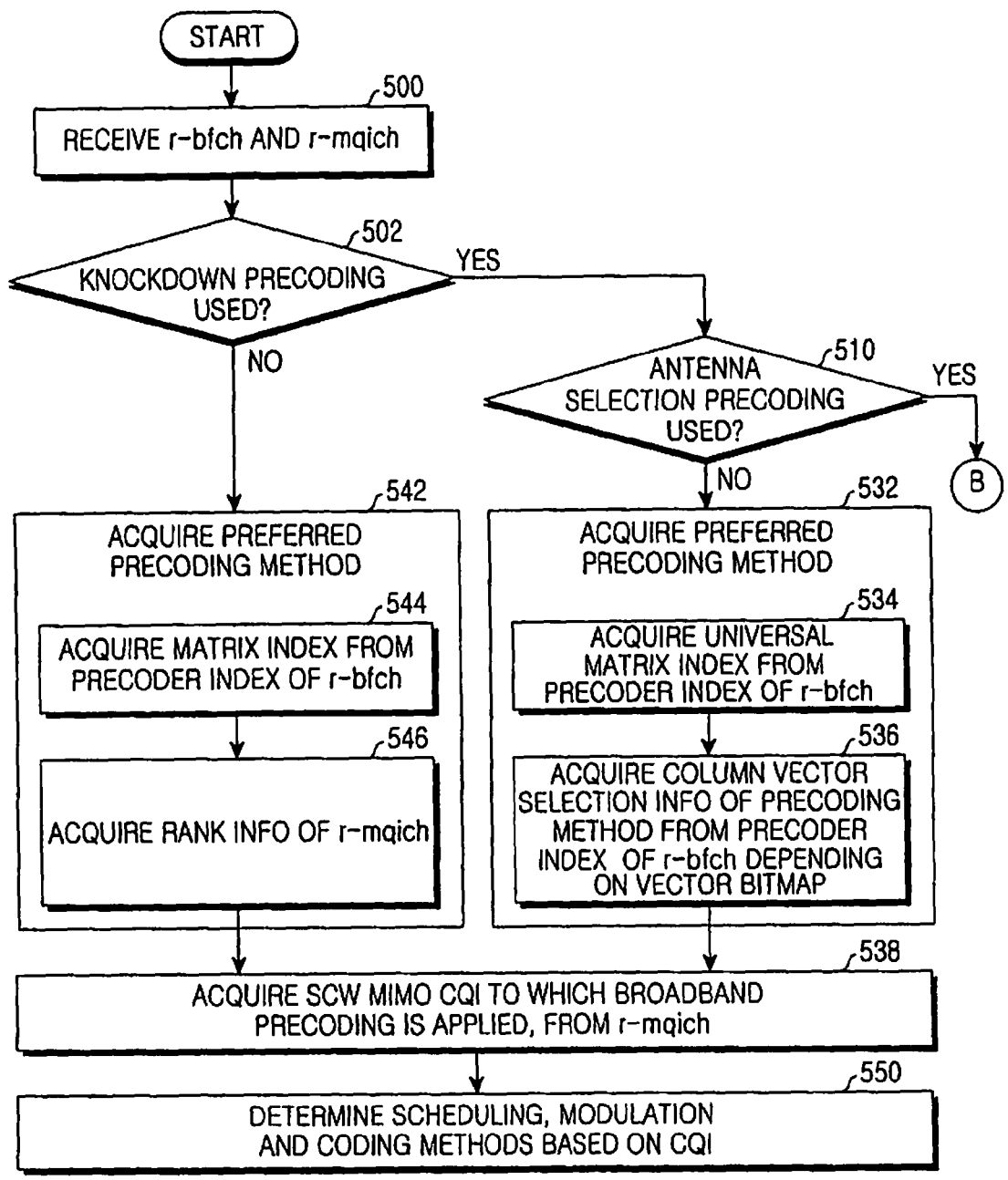
FIG. 5 is a diagram illustrating a process in which a base station receives MIMO-related feedback information when r-bfch and r-mqich are activated in an SCW MIMO mode according to an embodiment of the present invention.
Figure 5B:
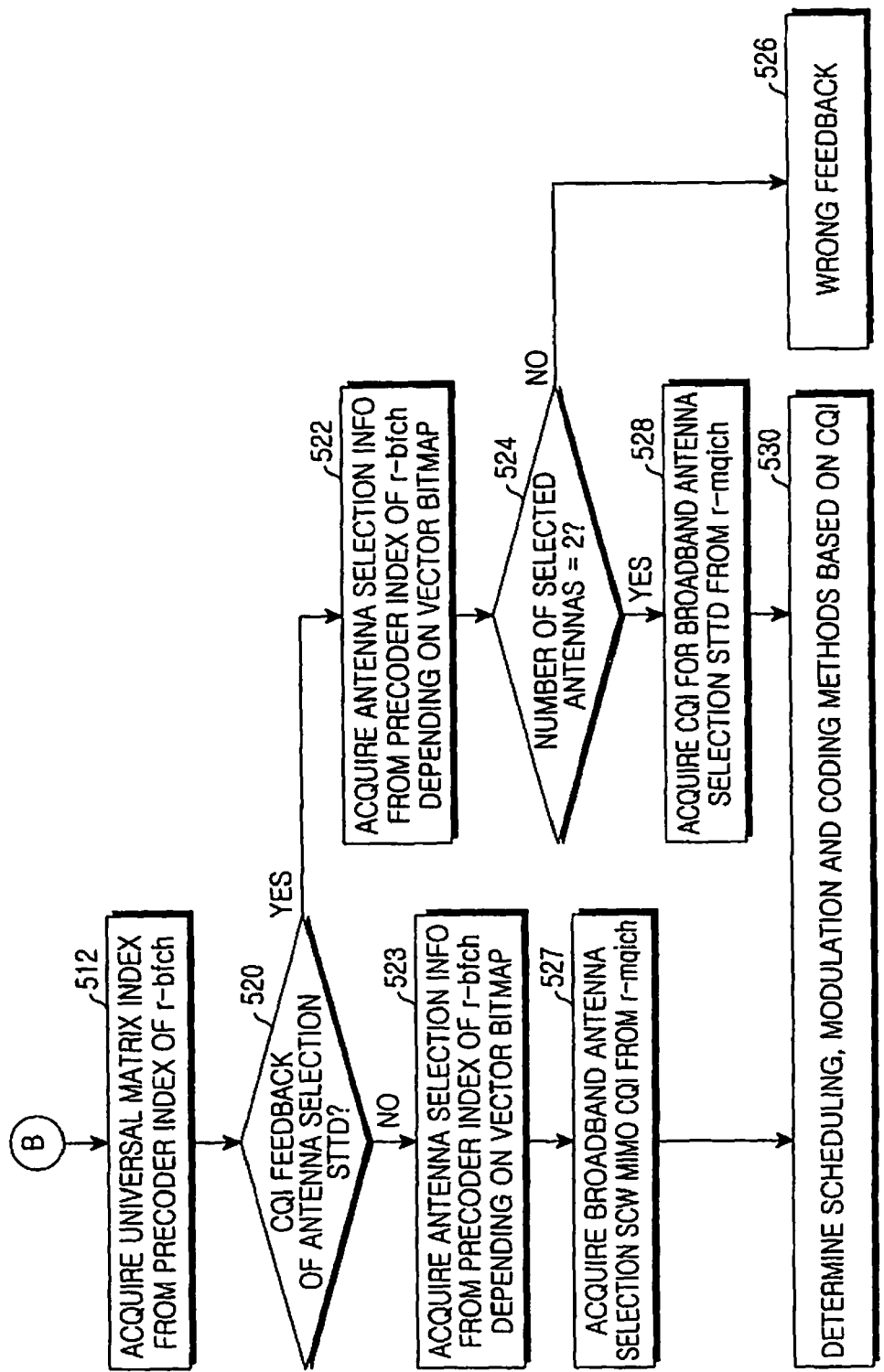

FIG. 5 is a diagram illustrating a process in which a base station receives MIMO-related feedback information when r-bfch and r-mqich are activated in an SCW MIMO mode according to an embodiment of the present invention.

In step 500, a base station receives signals of r-bfch and r-mqich channels from a mobile terminal, and determines in step 502 whether knockdown precoding is used or ready-made precoding is used. The base station can determine whether knockdown precoding is used or ready-made precoding is used, depending on the preset information agreed upon between the mobile terminal and the base station by upper layer signaling.

If it is determined in step 502 that knockdown precoding is used, the base station determines in step 510 whether Antenna Selection precoding is used or the normal knockdown precoding is used. If the Antenna Selection precoding is used, the base station analyzes a universal matrix index in a precoder index field of r-bfch in step 512. If the universal matrix index is set to '1', it indicates the feedback of a CQI for Antenna Selection STTD, and if the universal matrix index is set to '0', it indicates the feedback of a CQI for Antenna Selection MIMO. The feedback of a CQI for Antenna Selection STTD means that the mobile terminal reports a CQI for Antenna Selection STTD, and this is the same even in FIG. 7 described below.

The base station determines in step 520 whether the CQI being fed back in this way is a CQI for Antenna Selection STTD or a CQI for Antenna Selection MIMO. If it is determined that the CQI is a CQI for Antenna Selection STTD, the base station analyzes antenna selection information using a vector bitmap in a precoder index field of r-bfch in step 522, and determines in step 524 whether the number of selected antennas is 2. If the number of selected antennas is not 2, the base station makes a 'wrong feedback' decision in step 526 because the CQI cannot be considered as the feedback for Antenna Selection STTD. However, if it is determined in step 524 that the number of selected antennas is 2, the base station acquires a CQI for broadband Antenna Selection STTD from a CQI field of r-mqich in step 530. Based on the acquired CQI, the base station determines scheduling, modulation and coding methods in step 550.

However, if it is determined in step 520 that a CQI for Antenna Selection MIMO is fed back, the base station acquires antenna selection information using a vector bitmap in a precoder index field of r-bfch in step 523. Thereafter, in step 527, the base station acquires an Antenna Selection SCW MIMO CQI where the Antenna Selection MIMO to be applied in the broadband is reflected, from the CQI field of r-mqich. Based on the acquired CQI, the base station determines scheduling, modulation and coding methods in step 530.

As described in FIG. 4, 'report on CQI for Antenna Selection STTD', 'presence of Antenna Selection STTD' and 'use of Antenna Selection STTD' all are used herein as the same expression. Therefore, even in the reception process of FIG. 5, the condition of step 520 should be construed as the condition 'whether Antenna Selection STTD is present?' or 'whether Antenna Selection STTD is used'.

However, if it is determined in step 510 that the normal knockdown precoding rather than Antenna Selection precoding is used, the base station acquires a precoding method preferred by the mobile terminal in step 532. A detailed description of step 532 is given below. In step 534, the base station acquires universal matrix index information from a precoder index field of r-bfch. Thereafter, in step 536, the base station acquires column vector selection information of a universal matrix selected in step 534 using the vector bitmap in the precoder index field of r-bfch. After acquiring the information on the precoding method through the above process, the base station acquires an SCW MIMO CQI to which precoding to be applied in the broadband is applied, from r-mqich in step 538. Based on the acquired CQI, the base station determines scheduling, modulation and coding methods in step 550.

However, if it is determined in step 502 that it uses ready-made precoding, the base station analyzes a precoding method preferred by the mobile terminal in step 542. A detailed description of FIG. 542 is given below. In step 544, the base station acquires precoding matrix index information from a precoder index field of r-bfch. Thereafter, in step 546, the base station acquires Rank information from a Rank field of r-mqich. As a result, submatrixes of a first column vector of the matrix acquired in step 544 through a (Rank)$^{th}$ column vector acquired in step 546 become the precoding matrix to be actually used. After acquiring information on the precoding method through the above process, the base station acquires an SCW MIMO CQI to which broadband precoding is applied, from r-mqich in step 538. Based on the acquired CQI, the base station determines scheduling, modulation and coding methods in step 550.

Figure 6A:
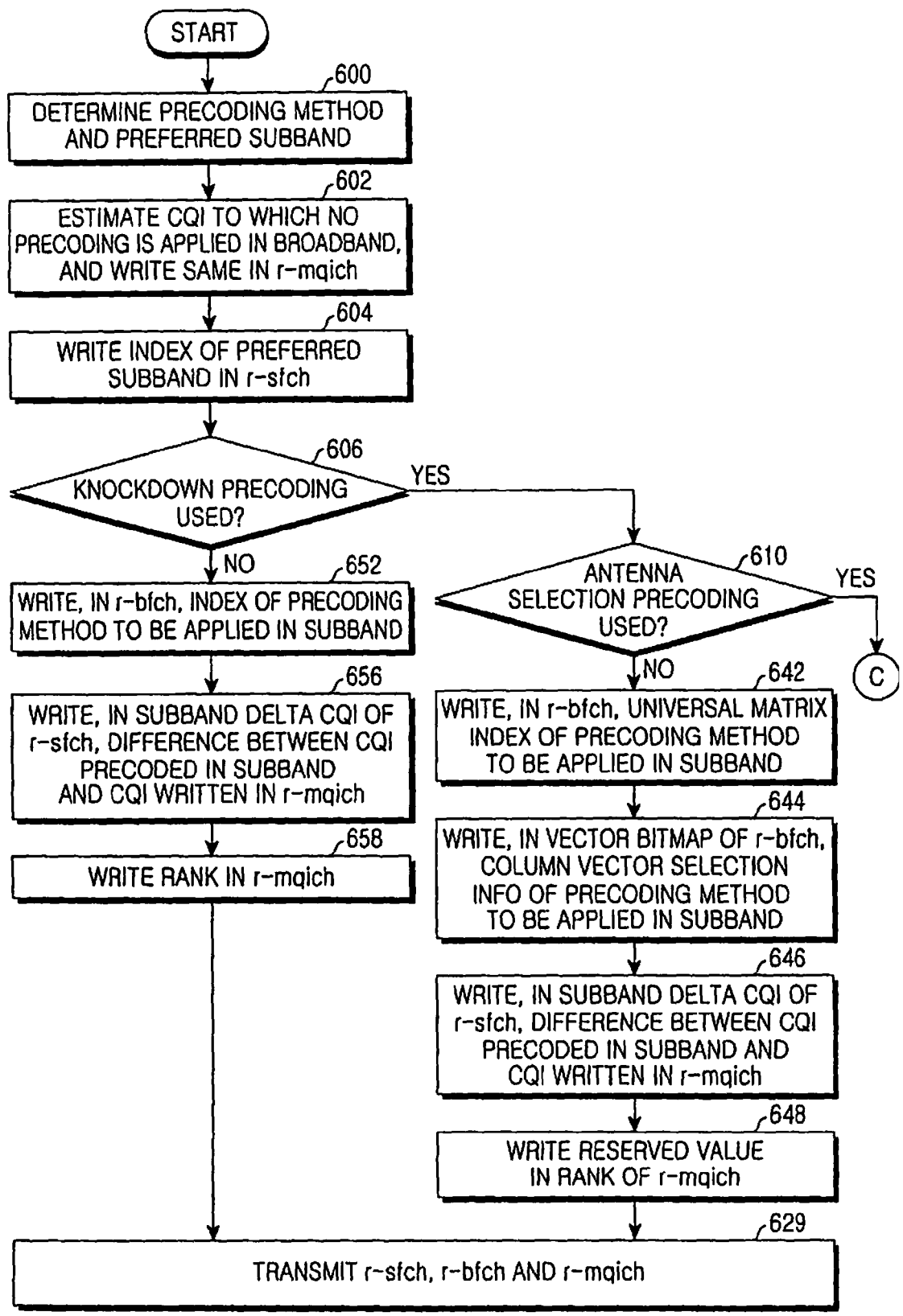
FIG. 6 is a diagram illustrating a process in which a mobile terminal transmits MIMO-related feedback information when r-bfch, r-sfch and r-mqich are activated in an SCW MIMO mode according to an embodiment of the present invention.
Figure 6B:
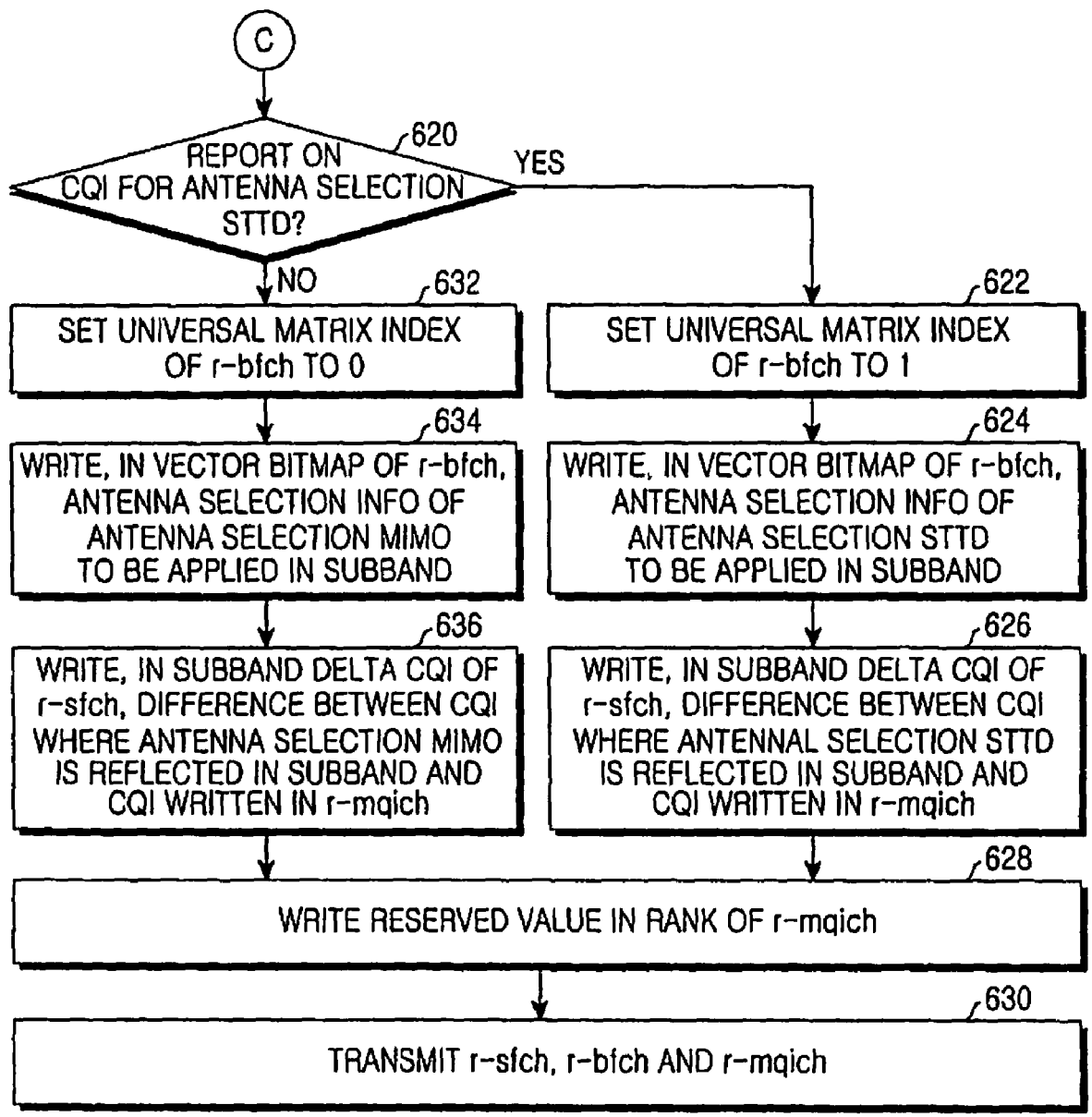

FIG. 6 is a diagram illustrating a process in which a mobile terminal transmits MIMO-related feedback information when r-bfch, r-sfch and r-mqich are activated in an SCW MIMO mode according to an embodiment of the present invention.

In step 600, a mobile terminal determines a precoding method and a preferred subband. The term 'preferred subband' as used herein means a subband having a good channel quality. In step 602, the mobile terminal estimates a CQI for the case where no precoding is applied in the broadband, and writes the value in a CQI field of r-mqich. In step 604, the mobile terminal writes the preferred subband index in a subband index field of r-sfch. In addition, the mobile terminal pads other feedback information to the reverse feedback channel according to the precoding scheme determined in step 600.

The mobile terminal determines in step 606 whether knockdown precoding is used or ready-made precoding is used. The mobile terminal can determine in step 606 whether it uses a knockdown precoding method or uses a ready-made precoding method, depending on the preset information agreed upon between the mobile terminal and the base station by upper layer signaling.

If it is determined in step 606 that knockdown precoding is used, the mobile terminal determines in step 610 whether it uses Antenna Selection precoding, or uses the normal knockdown precoding other than the Antenna Selection precoding. Similarly, the mobile terminal can determine which precoding it uses as a knockdown precoding method, depending on the preset information agreed upon between the mobile terminal and the base station by upper layer signaling.

If it is determined in step 610 that the mobile terminal uses Antenna Selection precoding, the mobile terminal determines in step 620 whether it intends to report a CQI for Antenna Selection STTD, or to report a CQI for Antenna Selection MIMO.

If it is determined in step 620 that the mobile terminal intends to report a CQI for Antenna Selection STTD, the mobile terminal proceeds to step 622 where it sets, to '1', a universal matrix index for indicating a universal matrix of a precoding matrix among the precoder index fields of r-bfch. In step 624, the mobile terminal writes antenna selection information of Antenna Selection STTD to be applied in the subband, in a vector bitmap of a precoder index field of r-bfch. Herein, the number of selected antennas should necessarily be 2. Otherwise, the base station cannot apply STTD to the selected antennas.

In step 626, the mobile terminal finds a difference between a CQI obtained when Antenna Selection STTD is applied in the subband and a CQI to which the broadband precoding is not applied, written in a CQI field of r-mqich, and writes the value in a subband delta CQI field of r-sfch. Since Rank information is meaningless in Antenna Selection STTD transmission, the mobile terminal writes a reserved value in Rank of r-mqich in step 628. In step 630, the mobile terminal transmits the feedback information over r-bfch and r-mqich generated through the above process.

However, if it is determined in step 620 that it intends to report an Antenna Selection MIMO CQI, the mobile terminal sets, to '0', a universal matrix index in a precoder index field of r-bfch in step 632. In step 634, the mobile terminal writes antenna selection information of Antenna Selection MIMO to be applied in the subband, in a vector bitmap of a precoder index field of r-bfch. Thereafter, in step 636, the mobile terminal finds a difference between an SCW MIMO CQI to which Antenna Selection MIMO is applied in the subband and a CQI to which the broadband precoding is not applied, written in a CQI field of r-mqich, and writes the value in a subband delta CQI field of r-sfch. Because Rank information is transferred over a vector bitmap in Antenna Selection MIMO transmission, there is no need to feed back separate Rank information. Therefore, the mobile terminal writes a reserved value in a Rank field of r-mqich in step 628, and transmits the feedback information over r-bfch and r-mqich generated through the above process in step 630.

However, if it is determined in step 610 that the normal knockdown precoding other than Antenna Selection precoding is used, the mobile terminal writes a universal matrix index of precoding to be applied in the subband, in a precoder index field of r-bfch in step 642. In step 644, the mobile terminal writes, in a vector bitmap of a precoder index field of r-bfch, information indicating which column vectors of the universal matrix designated in step 642 should be activated for precoding to be applied in the subband.

In step 646, the mobile terminal finds a difference between an SCW MIMO CQI to which precoding is applied in the subband and a CQI to which broadband precoding is not applied, written in a CQI field of r-mqich, and writes the value in a subband delta CQI field of r-sfch. In MIMO transmission to which the knockdown precoding is applied, because Rank information is transferred over a vector bitmap, there is no need to feed back separate Rank information. Therefore, the mobile terminal writes a reserved value in a Rank field of r-mqich in step 648, and transmits the feedback information of r-bfch and r-mqich, generated through the above process in step 629.

However, if it is determined in step 606 that ready-made precoding is used, the mobile terminal writes a precoding matrix index of a precoding method to be applied in the subband, in a precoder index field of r-bfch in step 652. In step 656, the mobile terminal finds a difference between an SCW MIMO CQI to which precoding is applied in the subband and a CQI to which broadband precoding is not applied, written in a CQI field of r-mqich, and writes the value in a subband delta CQI field of r-sfch. In order to find a precoding matrix actually used in the ready-made precoding method, there is a need for Rank information. Therefore, the mobile terminal writes Rank information in a Rank field of r-mqich in step 658, and transmits the feedback signals of r-bfch and r-mqich generated through the above process in step 629.

Figure 7A:
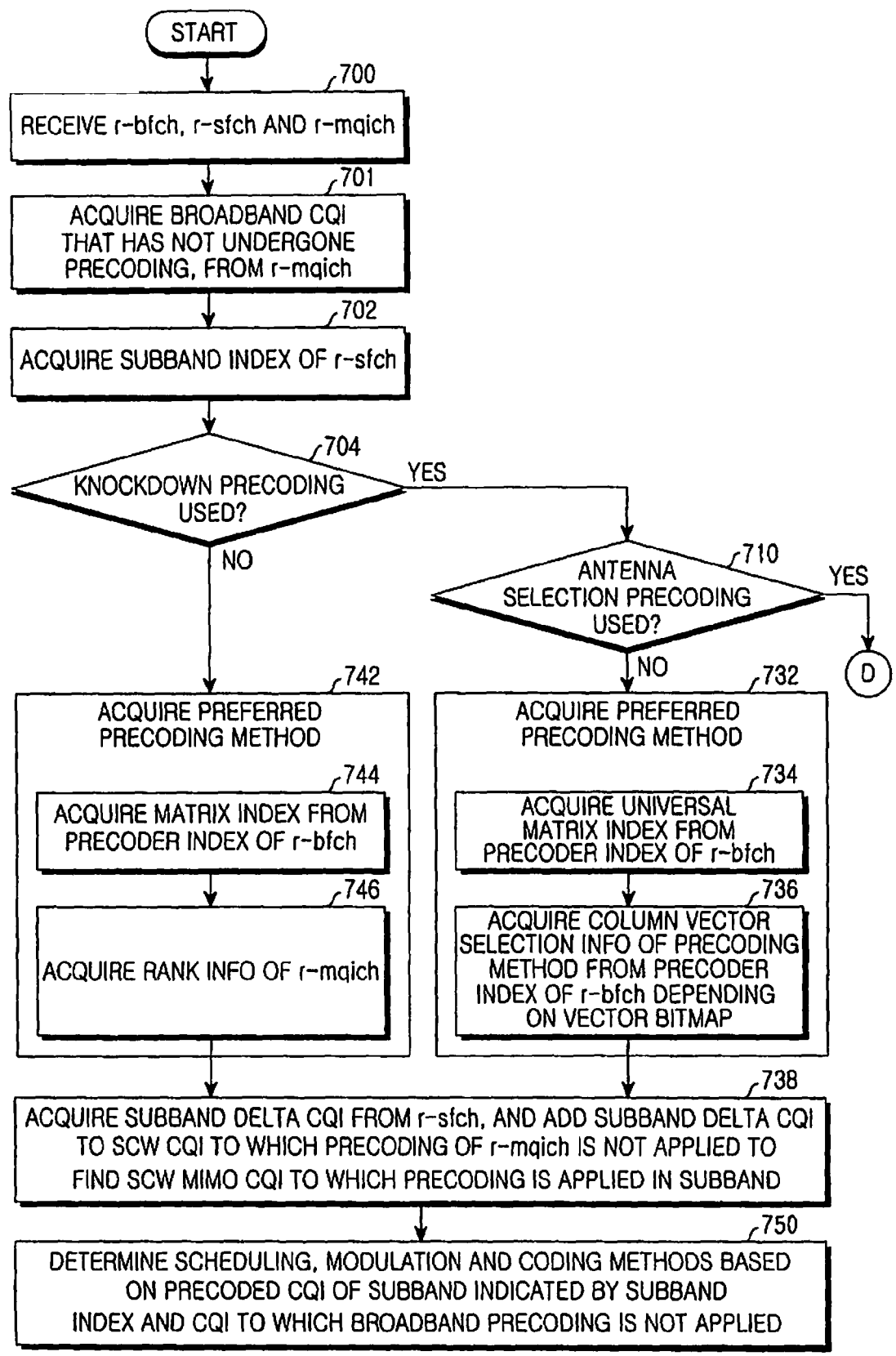
FIG. 7 is a diagram illustrating a process in which a base station receives MIMO-related feedback information when r-bfch, r-sfch and r-mqich are activated in an SCW MIMO mode according to an embodiment of the present invention.
Figure 7B:
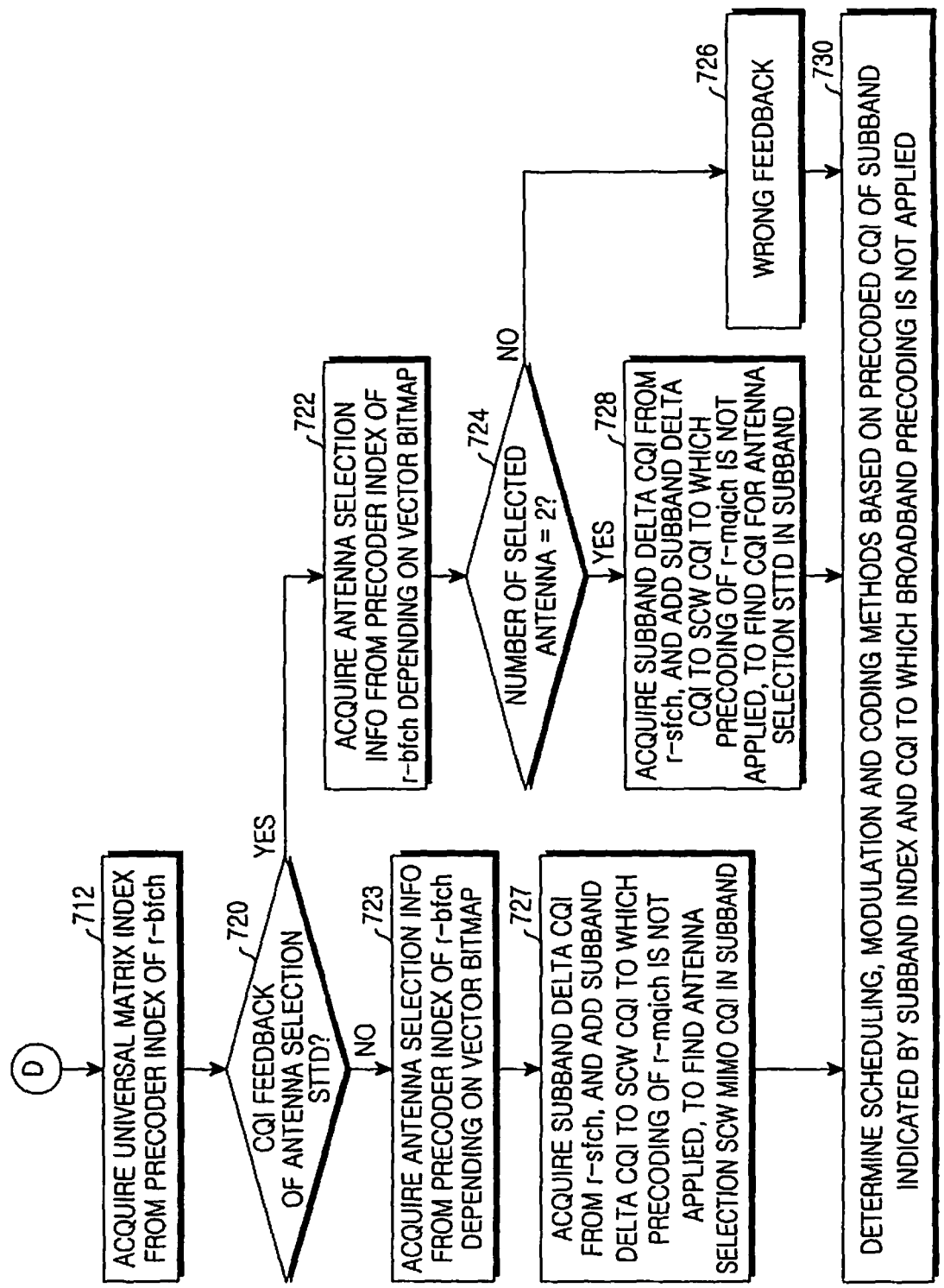

FIG. 7 is a diagram illustrating a process in which a base station receives MIMO-related feedback information when r-bfch, r-sfch and r-mqich are activated in an SCW MIMO mode according to an embodiment of the present invention.

In step 700, a base station receives r-bfch, r-sfch and r-mqich from a mobile terminal. In step 701, the base station acquires broadband CQI information to which no precoding is applied, from r-mqich. In step 702, the mobile terminal acquires information on a subband preferred by the mobile terminal, from a subband index field of r-sfch. The phrase 'subband preferred by the mobile terminal' means a subband having a good channel quality. The mobile terminal determines in step 704 whether a knockdown precoding method is used or a ready-made precoding method is used. The mobile terminal can determine whether a knockdown precoding method is used or a ready-made precoding method is used, depending on the preset information agreed upon between the mobile terminal and the base station by upper layer signaling.

If it is determined in step 704 that the knockdown precoding method is used, the base station determines in step 710 whether Antenna Selection precoding is used or the normal knockdown precoding is used. If Antenna Selection precoding is used, the base station acquires a universal matrix index from a precoder index field of r-bfch in step 712. If the acquired universal matrix index is set to '1', it indicates the feedback of a CQI for Antenna Selection STTD, and if the acquired universal matrix index is set to '0', it indicates the feedback of a CQI for Antenna Selection MIMO.

The base station determines in step 720 whether the CQI being fed back in this way is a CQI for Antenna Selection STTD or a CQI for Antenna Selection MIMO. If it is determined that the CQI is a CQI for Antenna Selection STTD, the base station acquires antenna selection information from a precoder index field of r-bfch using a vector bitmap in step 722. The base station determines in step 724 whether the number of selected antennas is 2, depending on the acquired antenna selection information. If it is determined in step 724 that the number of selected antennas is not 2, the base station makes a 'wrong feedback' decision in step 726 because the CQI cannot be considered as the feedback for Antenna Selection STTD. In the case where all feedback channels are activated, because it is possible to acquire a broadband CQI that has not undergone precoding, from a CQI field of r-mqich, even though the 'wrong feedback' decision is made in step 726, the base station can perform scheduling, modulation and coding processes based on the CQI to which broadband precoding is not applied, in step 730.

However, if it is determined in step 724 that the number of selected antennas is 2, the base station proceeds to step 728 where it acquires a subband delta CQI from a subband delta CQI field of r-sfch, and adds the acquired subband delta CQI to a broadband SCW CQI to which no precoding is applied, written in a CQI field of r-mqich, to find a CQI for the case where Antenna Selection STTD is applied in the subband. Based on the acquired broadband and subband CQI information, the base station determines scheduling, modulation and coding methods in step 730.

However, if it is determined in step 720 that a CQI for Antenna Selection MIMO is fed back, the base station acquires antenna selection information using a vector bitmap in a precoder index field of r-bfch in step 723. In step 727, the base station acquires a subband delta CQI from r-sfch, and adds the subband delta CQI to a broadband SCW CQI to which no precoding is applied, written in a CQI field of r-mqich, to find an SCW MIMO CQI for the case where the Antenna Selection MIMO is applied in the subband. Based on the acquired broadband and subband CQIs, the base station determines scheduling, modulation and coding methods in step 730.

However, if it is determined in step 710 that the normal knockdown precoding other than Antenna Selection precoding is used, the base station analyzes a precoding method preferred by the mobile terminal in step 732. A detailed description of step 732 will be given below. In step 734, the base station acquires universal matrix index information from a precoder index field of r-bfch. In step 736, the base station analyzes which column vector of the universal matrix selected in step 734 is selected, depending on the vector bitmap in a precoder index field of r-bfch. After acquiring the information on the precoding method, the base station acquires a subband delta CQI from a subband delta CQI field of r-sfch in step 738, and adds the subband delta CQI to a broadband SCW CQI to which no precoding is applied, written in a CQI field of r-mqich, to find a SCW MIMO CQI for the case where precoding is applied in the subband. Based on the acquired broadband and subband CQIs, the base station determines scheduling, modulation and precoding in step 750.

However, if it is determined in step 704 that it uses ready-made precoding, the base station acquires a precoding method preferred by the mobile terminal in step 742. A detailed description of step 742 will be given below. In step 744, the base station acquires precoding matrix index information from a precoder index field of r-bfch, and acquires Rank information from a Rank field of r-mqich in step 746. As a result, submatrixes of a first column vector of the matrix acquired in step 744 through a $(Rank)^{th}$ column vector acquired in step 746 become the actual precoding matrix. After acquiring information on the precoding method, the base station acquires a subband delta CQI from a subband delta CQI field of r-sfch in step 738, and adds the subband delta CQI to a broadband SCW CQI to which the precoding acquired from the CQI field of r-mqich is not applied, to find an SCW MIMO CQI for the case where precoding is applied in the subband. Based on the acquired broadband and subband CQIs, the base station determines scheduling, modulation and coding methods in step 750.

Figure 8:
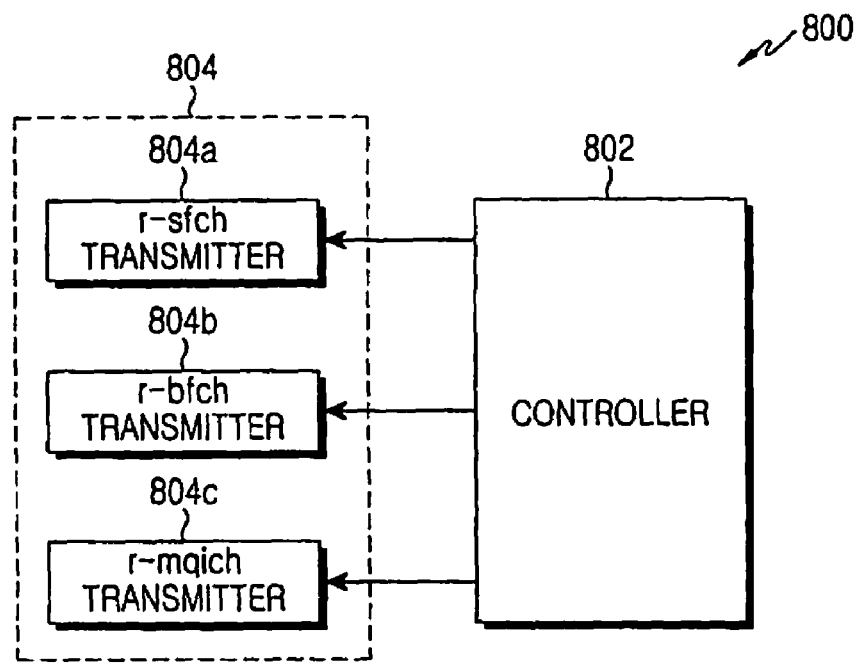
FIG. 8 is a block diagram illustrating a structure of a reverse feedback information transmission apparatus according to an embodiment of the present invention.

FIG. 8 is a block diagram illustrating a structure of a reverse feedback information transmission apparatus according to an embodiment of the present invention.

A reverse feedback information transmission apparatus 800 according to an embodiment of the present invention includes a reverse feedback channel transmitter 804 for transmitting reverse feedback information over a reverse feedback channel, and a controller 802 for controlling transmission of feedback information transmitted via the reverse feedback channel transmitter 804 according to the embodiment of the present invention shown in FIGS. 4 and 6.

That is, when only r-bfch and r-mqich are activated, the controller 802 controls the reverse feedback channel transmitter 804 to transmit feedback information to a base station by means of an r-bfch transmitter 804*b* and an r-mqich transmitter 804*c*, and when all of r-bfch, r-mqich and r-sfch are activated, the controller 802 controls the reverse feedback channel transmitter 804 to transmit feedback information by means of an r-sfch transmitter 804*a*, the r-bfch transmitter 804*b* and the r-mqich transmitter 804*c*.

The controller 802 according to the present invention uses knockdown precoding, and when it uses Antenna Selection precoding, the controller 802 controls the reverse feedback channel transmitter 804 so as to set an index field for indicating a universal matrix of a precoding matrix of the r-bfch, to a value indicating whether it intends to report a CQI for Antenna Selection STTD, write antenna selection information in a vector bitmap of the r-bfch, estimate a CQI according to the antenna selection information, write the value in a CQI field of the r-mqich, and insert a predetermined value in a Rank field of the r-mqich before transmission.

Further, in the embodiment of the present invention, the controller 802, when it sets the index field to the 'report on CQI for Antenna Selection STTD', controls the reverse feedback channel transmitter 804 so as to write, as the antenna selection information, the antennas selected for the Antenna Selection STTD to be applied in the broadband, and write, as the CQI, a CQI estimated taking the Antenna Selection STTD into account, before transmission.

However, when the controller 802 determines a subband having a good channel quality and sets the index field to 'report on CQI for Antenna Selection STTD', the controller 802 controls the reverse feedback channel transmitter 804 so as to write antennas selected for the Antenna Selection STTD to be applied in the subband, in a vector bitmap of the r-bfch as the antenna selection information, write a CQI estimated without applying precoding in the broadband, in a CQI field of the r-mqich, and insert a difference between a CQI where the Antenna Selection STTD is reflected in the subband and a CQI written in a CQI field of the r-mqich, into a subband delta CQI field of the r-sfch before transmission.

However, the controller 802, when it sets the index field to non-report on a CQI for Antenna Selection STTD, controls the reverse feedback channel transmitter 804 so as to write antennas selected for Antenna Selection MIMO transmission to be applied in the broadband, in a vector bitmap of the r-bfch as the antenna selection information, and write a MIMO CQI estimated by reflecting the Antenna Selection MIMO in the broadband, in a CQI field of the r-mqich before transmission.

In addition, when the controller 802 determines a subband having a good channel quality and sets the index field to non-report on a CQI for the Antenna Selection STTD, the controller 802 controls the reverse feedback channel transmitter 804 so as to write antennas selected for Antenna Selection MIMO to be applied in the subband, in a vector bitmap of the r-bfch as the antenna selection information, write a CQI estimated without applying precoding in the broadband, in a CQI field of the r-mqich, and insert a difference between a CQI to which the Antenna Selection MIMO is applied in the subband and a CQI written in a CQI field of the r-mqich, in a subband delta CQI field of the r-sfch before transmission.

Figure 9:
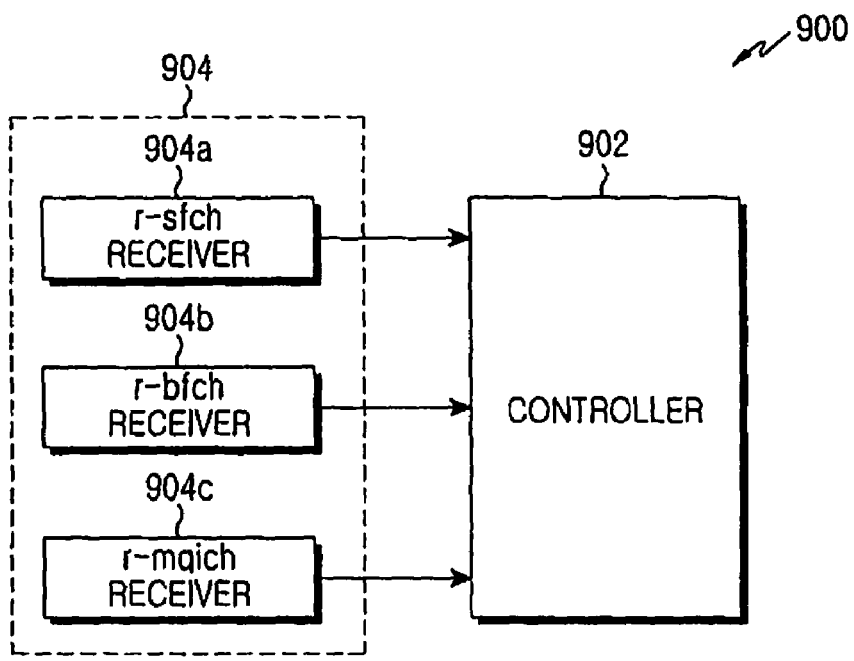
FIG. 9 is a block diagram illustrating a structure of a reverse feedback information reception apparatus according to an embodiment of the present invention.

FIG. 9 is a block diagram illustrating a structure of a reverse feedback information reception apparatus 900 according to an embodiment of the present invention.

A feedback information reception apparatus 900 according to an embodiment of the present invention a reverse feedback channel receiver 904 for receiving reverse feedback information over a reverse feedback channel, and a controller 902 for controlling reception of the reverse feedback information by means of the reverse feedback channel receiver 904 according to the embodiment of the present invention show in FIGS. 5 and 7. The reverse feedback channel receiver 904 includes an r-bfch receiver 904b, an r-mqich receiver 904c and an r-sfch receiver 904a for receiving feedback information over r-bfch, r-mqich and r-sfch.

The controller 902 according to an embodiment of the present invention reads a value set to indicate the report on a CQI for Antenna Selection STTD from an index field for indicating a universal matrix of a precoding matrix of the r-bfch, acquires antenna selection information from a vector bitmap field of the bfch, and acquires a CQI estimated depending on the antenna selection information, from a CQI field of the r-mqich.

Further, when a value of the index field is set to a value indicating the report on a CQI for Antenna Selection STTD, the controller 902 determines whether the antenna selection information of the r-bfch indicates that the number of selected antennas is 2, acquires an estimated CQI in which the Antenna Selection STTD is reflected, from a CQI field of the r-mqich if it is determined that the number of selected antennas is 2, and reports 'wrong feedback' information if the number of selected antennas is not 2.

When the reverse feedback channel receiver 904 receives an r-sfch signal including a subband index having a channel quality, selected by the mobile terminal, and a value of the index field is set to a value indicating the report on a CQI for Antenna Selection STTD, the controller 902 determines whether the antenna selection information included in the r-bfch signal indicates that the number of selected antennas is 2, acquires a subband delta CQI indicative of a difference between a CQI where the Antenna Selection STTD is reflected in the subband and a CQI estimated without applying precoding in the broadband, written in a CQI field of the r-mqich, from a subband delta CQI field of the r-sfch if it is determined that the number of selected antennas is 2, and adds the subband delta CQI to the CQI written in the CQI field of the r-mqich to calculate a CQI where Antenna Selection STTD is reflected in the subband.

However, when the value of the index field is set to a value indicating non-report on a CQI for the Antenna Selection STTD, the controller 902 acquires antenna selection information indicating antennas selected for Antenna Selection MIMO to be applied in the broadband, from a precoder index field of the r-bfch, and acquires a MIMO CQI estimated by reflecting the Antenna Selection MIMO in the broadband, from a CQI field of the r-mqich.

When the reverse feedback channel receiver 904 receives an r-sfch signal including a subband index having a good channel quality, selected by the mobile terminal, and the value of the index field is set to a value indicating non-report on a CQI for the Antenna Selection STTD, the controller 902 acquires the antenna selection information indicating antennas selected for Antenna Selection MIMO transmission to be applied in the subband, from the r-bfch, acquires a subband delta CQI indicative of a difference between a CQI where the Antenna Selection MIMO is reflected in the subband and a CQI estimated without applying precoding in the broadband, written in a CQI field of the r-mqich, from a subband delta CQI field of the r-sfch, and adds the subband delta CQI to a CQI written in a CQI field of the r-mqich to calculate a CQI where the Antenna Selection MIMO to be applied in the subband is reflected.

As is apparent from the forgoing description, the present invention can support both ready-made precoding and knockdown precoding without exceeding the limit on the structure of the feedback channels and the amount of information defined in the feedback channels of the UMB system, can also support both of the Transmit Diversity technology to which no precoding is applied, and the Antenna Selection STTD technology.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for transmitting feedback information by a mobile terminal in a mobile communication system, the method comprising:
   when knockdown precoding is used and Antenna Selection precoding is used, setting an index field for indicating a universal matrix of a precoding matrix of a first reverse feedback channel to a value indicating whether Antenna Selection Space Time Transmit Diversity (STTD) is present;
   when the knockdown precoding is used and the Antenna Selection precoding is used, writing antenna selection information in a vector bitmap field of the first reverse feedback channel;
   when the knockdown precoding is used and the Antenna Selection precoding is used, estimating Channel Quality Information (CQI) according to the antenna selection information and writing the estimated CQI in a CQI field of a second reverse feedback channel;
   when the knockdown precoding is used and the Antenna Selection precoding is used, inserting a predetermined value into a Rank field of the second reverse feedback channel; and
   transmitting a signal of the first feedback channel including the index field and the antenna selection information and a signal of the second feedback channel including the CQI field, to a base station.

2. The method of claim 1, wherein when the Antenna Selection STTD is present, the antenna selection information indicates antennas selected for the Antenna Selection STTD to be applied in a broadband, and the CQI written in the CQI field of the second reverse feedback channel is a CQI estimated by reflecting the Antenna Selection STTD.

3. The method of claim 1, wherein when the mobile terminal determines a subband having a channel quality and the Antenna Selection STTD present, the antenna selection information indicates antennas selected for the Antenna Selection STTD to be applied in the subband, and the CQI written in the CQI field of the second reverse feedback channel is a CQI estimated without applying precoding in a broadband.

4. The method of claim 3, further comprising:
inserting a difference between the CQI where the Antenna Selection STTD is reflected in the subband and the CQI written in the CQI field of the second reverse feedback channel, into a subband delta CQI field of a third reverse feedback channel, and transmitting the same.

5. The method of claim 1, wherein when the Antenna Selection STTD is not present, the antenna selection information indicates antennas selected for Antenna Selection Multiple Input Multiple Output (MIMO) to be applied in a broadband, and the CQI written in the CQI field of the second reverse feedback channel is a MIMO CQI estimated by reflecting the Antenna Selection MIMO in the broadband.

6. The method of claim 1, wherein when the mobile terminal determines a subband having a good channel quality and the Antenna Selection STTD is not present, the antenna selection information indicates antennas selected for the MIMO transmission to be applied in the subband, and the CQI written in the CQI field of the second reverse feedback channel is a CQI estimated without applying precoding in a broadband.

7. The method of claim 6, further comprising:
inserting a difference between the CQI where the Antenna Selection MIMO is reflected in the subband and the CQI written in the CQI field of the second reverse feedback channel, into a subband delta CQI field of a third reverse feedback channel, and transmitting the same.

8. A method for receiving feedback information by a base station in a mobile communication system, the method comprising:
receiving a first reverse feedback channel signal and a second reverse feedback channel signal from a mobile terminal that uses knockdown precoding as a precoding method and uses Antenna Selection precoding;
reading a value set to indicate presence of Antenna Selection Space Time Transmit Diversity (STTD) from a index field for indicating a universal matrix of a precoding matrix of the first reverse feedback channel signal;
when the mobile terminal uses the knockdown precoding and uses the Antenna Selection precoding, acquiring antenna selection information from a vector bitmap field of the first reverse feedback channel signal; and
when the mobile terminal uses the knockdown precoding and uses the Antenna Selection precoding, acquiring a Channel Quality Information (CQI) estimated according to the antenna selection information, from a CQI field of the second reverse feedback channel signal.

9. The method of claim 8, further comprising:
when a value of the index field is set to a value indicating presence of the Antenna Selection STTD, determining whether the antenna selection information included in the first reverse feedback channel signal indicates that the number of selected antennas is 2.

10. The method of claim 9, wherein when the number of selected antennas is 2, the CQI written in the CQI field of the second reverse feedback channel is a CQI estimated by reflecting the Antenna Selection STTD.

11. The method of claim 9, wherein the antenna selection information indicates antennas selected for the Antenna Selection STTD to be applied in a broadband.

12. The method of claim 9, further comprising:
when the number of selected antennas is not 2, reporting information indicating wrong feedback.

13. The method of claim 8, wherein when the base station receives a signal of a third reverse feedback channel including a subband index having a good channel quality, selected by the mobile terminal, and a value set in the index field is set to a value indicating presence of the Antenna Selection STTD, the antenna selection information indicates antennas selected for the Antenna Selection STTD applied in the subband, and the CQI written in the CQI field of the second reverse feedback channel is a CQI estimated without applying precoding in a broadband.

14. The method of claim 13, further comprising:
determining whether the antenna selection information included in the first reverse feedback channel signal indicates that the number of selected antennas is 2.

15. The method of claim 14, further comprising:
when the number of selected antennas is 2, acquiring a subband delta CQI indicative of a difference between the CQI where the Antenna Selection STTD is reflected in the subband and the CQI written in the CQI field of the second reverse feedback channel, from a subband delta CQI field of the third reverse feedback channel; and
adding the subband delta CQI to the CQI written in the CQI field of the second reverse feedback channel to calculate a CQI for Antenna Selection STTD in the subband.

16. The method of claim 8, wherein when a value set in the index field is set to a value indicating absence of the Antenna Selection STTD, the antenna selection information of the first reverse feedback channel signal indicates antennas selected for Antenna Selection Multiple Input Multiple Output (MIMO) to be applied in a broadband, and the CQI written in the CQI field of the second reverse feedback channel is a MIMO CQI estimated by reflecting the Antenna Selection MIMO in the broadband.

17. The method of claim 8, wherein when the base station receives a signal of a third reverse feedback channel including a subband index having a good channel quality, selected by the mobile terminal, and a value set in the index field is set to a value indicating absence of the Antenna Selection STTD, the antenna selection information indicates antennas selected for Antenna Selection MIMO to be applied in the subband, and the CQI written in the CQI field of the second reverse feedback channel is a value estimated without applying precoding in a broadband.

18. The method of claim 17, further comprising:
acquiring a subband delta CQI indicative of a difference between the CQI where the Antenna Selection is reflected in the subband and the CQI written in the CQI field of the second reverse feedback channel, from the subband delta CQI field of the third reverse feedback channel; and
adding the subband delta CQI to the CQI written in the CQI field of the second reverse feedback channel to calculate a CQI where the Antenna Selection MIMO to be applied in the subband is reflected.

19. An apparatus for transmitting feedback information in a mobile communication system, the apparatus comprising:
a reverse feedback channel transmitter for transmitting a signal of a first reverse feedback channel and a signal of a second reverse feedback channel; and
a controller for, when knockdown precoding is used and Antenna Selection precoding is used, setting an index field for indicating a universal matrix of a precoding matrix of the first reverse feedback channel to a value indicating presence of Antenna Selection Space Time Transmit Diversity (STTD), writing antenna selection information in a vector bitmap field of the first reverse feedback channel, estimating Channel Quality Information (CQI) according to the antenna selection information, writing the estimated CQI in a CQI field of the second reverse feedback channel, and inserting a predetermined value in a Rank field of the second reverse feedback channel.

20. The apparatus of claim 19, wherein when the controller sets the index field to a value indicating presence of the Antenna Selection STTD, the antenna selection information indicates antennas selected for the Antenna Selection STTD to be applied in a broadband, and the CQI is a CQI estimated by reflecting the Antenna Selection STTD.

21. The apparatus of claim 19, wherein when the controller determines a subband having a good channel quality and sets the index field to a value indicating presence of the Antenna Selection STTD, the antenna selection information indicates antennas selected for the Antenna Selection STTD to be applied in the subband, and the CQI written in the CQI field of the second reverse feedback channel is a CQI estimated without applying precoding in a broadband.

22. The apparatus of claim 21, wherein the controller inserts a difference between the CQI where the Antenna Selection STTD is reflected in the subband and the CQI written in the CQI field of the second reverse feedback channel, in a subband delta CQI field of a third reverse feedback channel, and transmits a signal of the third reverse feedback channel by means of the reverse feedback channel transmitter.

23. The apparatus of claim 19, wherein when the controller sets the index field to a value indicating absence of the Antenna Selection STTD, the antenna selection information indicates antennas selected for Antenna Selection Multiple Input Multiple Output (MIMO) transmission to be applied in a broadband, and the CQI written in the CQI field of the second reverse feedback channel is a MIMO CQI estimated by reflecting the Antenna Selection MIMO in a broadband.

24. The apparatus of claim 19, wherein when the controller determines a subband having a good channel quality and sets the index field to a value indicating absence of the Antenna Selection STTD, the antenna selection information indicates antennas selected for Antenna Selection MIMO to be applied in the subband, and the CQI written in the CQI field of the second reverse feedback channel is a CQI estimated without applying precoding in a broadband.

25. The apparatus of claim 24, wherein the controller controls the reverse feedback channel transmitter so as to insert a difference between the CQI where the Antenna Selection MIMO is reflected in the subband and the CQI written in the CQI field of the second reverse feedback channel, into a subband delta CQI field of a third reverse feedback channel, and transmit a signal of the third reverse feedback channel.

26. An apparatus for receiving feedback information in a mobile communication system, the apparatus comprising:
a reverse feedback channel receiver for receiving a first reverse feedback channel signal and a second reverse feedback channel signal from a mobile terminal that uses knockdown precoding as a precoding method and uses Antenna Selection precoding; and
a controller for reading a value set to indicate presence of Antenna Selection Space Time Transmit Diversity (STTD) from an index field for indicating a universal matrix of a precoding matrix of the first reverse feedback channel signal, acquiring antenna selection information from a vector bitmap field of the first reverse feedback channel signal, and acquiring a Channel Quality Information (CQI) estimated according to the antenna selection information from a CQI field of the second reverse feedback channel signal.

27. The apparatus of claim 26, wherein when a value of the index field is set to a value indicating presence of the Antenna Selection STTD, the controller determines whether the antenna selection information of the first reverse feedback channel signal indicates that the number of selected antennas is 2, and acquiring a CQI estimated by reflecting the Antenna Selection STTD, from a CQI field of the second reverse feedback channel if it is determined that the number of selected antennas is 2.

28. The apparatus of claim 26, wherein the antenna selection information indicates antennas selected for the Antenna Selection STTD to be applied in a broadband.

29. The apparatus of claim 27, wherein when the number of selected antennas is not 2, the controller reports information indicating wrong feedback.

30. The apparatus of claim 26, wherein when the reverse feedback channel receiver receives a signal of a third reverse feedback channel including a subband index having a good channel quality, selected by the mobile terminal, and a value of the index field is set to a value indicating presence of the Antenna Selection STTD, the antenna selection information indicates antennas selected for the Antenna Selection STTD to be applied in the subband, and the CQI written in the CQI field of the second reverse feedback channel is a CQI estimated without applying precoding in a broadband.

31. The apparatus of claim 30, wherein the controller determines whether the antenna selection information of the first reverse feedback channel signal indicates that the number of selected antennas is 2, and when the number of selected antennas is 2, the controller acquires a subband delta CQI indicative of a difference between the CQI where the Antenna Selection STTD is reflected in the subband and the CQI written in the CQI field of the second reverse feedback channel, from a subband delta CQI field of the third reverse feedback channel, and adds the subband delta CQI to the CQI written in the CQI field of the second reverse feedback channel to calculate a CQI where Antenna Selection STTD is reflected in the subband.

32. The apparatus of claim 26, wherein when a value of the index field is set to a value indicating absence of the Antenna Selection STTD, the antenna selection information of the first reverse feedback channel signal antennas selected for the Multiple Input Multiple Output (MIMO) transmission to be applied in a broadband, and the CQI written in the CQI field of the second reverse feedback channel is a MIMO CQI estimated by reflecting the antenna selection information to be applied for the MIMO transmission in a broadband.

33. The apparatus of claim 26, wherein when the reverse feedback channel receiver receives a signal of a third reverse feedback channel including a subband index having a good channel quality, selected by the mobile terminal, and a value of the index field is set to a value indicating absence of the Antenna Selection STTD, the antenna selection information indicates antennas selected for Antenna Selection MIMO transmission to be applied in the subband, and the CQI written in the CQI field of the second reverse feedback channel is a CQI estimated without applying precoding in a broadband.

34. The apparatus of claim 33, wherein the controller acquires a subband delta CQI indicative of a difference between the CQI where the Antenna Selection MIMO is reflected in the subband and the CQI written in the CQI field of the second reverse feedback channel, from a subband delta CQI field of the third reverse feedback channel, and adds the subband delta CQI to the CQI written in the CQI field of the second reverse feedback channel to calculate a CQI where the Antenna Selection MIMO to be applied in the subband is reflected.

35. A method for transmitting feedback information by a mobile terminal in a mobile communication system, the method comprising:
when knockdown precoding is used and Antenna Selection precoding is used, setting an index field for indicating a universal matrix of a precoding matrix of a first reverse feedback channel to a value indicating report on Channel Quality Information (CQI) for Antenna Selection Space Time Transmit Diversity (STTD);

when the knockdown precoding is used and the Antenna Selection precoding is used, writing antenna selection information in a vector bitmap field of the first reverse feedback channel;

when the knockdown precoding is used and the Antenna Selection precoding is used, estimating a CQI value according to the antenna selection information and writing the estimated CQI in a CQI field of a second reverse feedback channel;

when the knockdown precoding is used and the Antenna Selection precoding is used, inserting a predetermined value in a Rank field of the second reverse feedback channel; and transmitting a signal of the first feedback channel including the index field and the antenna selection information and a signal of the second feedback channel including the CQI field, to a base station.

36. A method for receiving feedback information by a base station in a mobile communication system, the method comprising:

receiving a first reverse feedback channel signal and a second reverse feedback channel signal from a mobile terminal that uses knockdown precoding as a precoding method and uses Antenna Selection precoding;

reading a value set to indicate report on Channel Quality Information (CQI) for Antenna Selection Space Time Transmit Diversity (STTD) from an index field for indicating a universal matrix of a precoding matrix of the first reverse feedback channel signal;

when the mobile terminal uses the knockdown precoding and uses the Antenna Selection precoding, acquiring antenna selection information from a vector bitmap field of the first reverse feedback channel; and when the mobile terminal uses the knockdown precoding and uses the Antenna Selection precoding, acquiring a CQI estimated according to the antenna selection information from a CQI field of the second reverse feedback channel.

37. An apparatus for transmitting feedback information in a mobile communication system, the apparatus comprising:

a reverse feedback channel transmitter for transmitting a signal of a first reverse feedback channel and a signal of a second reverse feedback channel; and a controller for, when knockdown precoding is used and Antenna Selection precoding is used, setting an index field for indicating a universal matrix of a precoding matrix of the first reverse feedback channel to a value indicating report on Channel Quality Information (CQI) for Antenna Selection Space Time Transmit Diversity (STTD), writing antenna selection information in a vector bitmap field of the first reverse feedback channel, estimating a CQI value according to the antenna selection information, writing the estimated CQI in a CQI field of the second reverse feedback channel, and inserting a predetermined value in a Rank field of the second reverse feedback channel.

38. An apparatus for receiving feedback information in a mobile communication system, the apparatus comprising:

a reverse feedback channel receiver for receiving a first reverse feedback channel signal and a second reverse feedback channel signal from a mobile terminal that uses knockdown precoding as a precoding method and uses Antenna Selection precoding; and a controller for reading a value set to indicate report on Channel Quality Information (CQI) for Antenna Selection Space Time Transmit Diversity (STTD) from an index field for indicating a universal matrix of a precoding matrix of the first reverse feedback channel signal, acquiring antenna selection information from a vector bitmap field of the first reverse feedback channel, and acquiring a CQI estimated according to the antenna selection information from a CQI field of the second reverse feedback channel.

\* \* \* \* \*